(12) United States Patent
Ishida et al.

(10) Patent No.: US 11,368,123 B2
(45) Date of Patent: Jun. 21, 2022

(54) INSTALLATION STRUCTURE OF SOLAR CELL PANEL

(71) Applicant: KANEKA CORPORATION, Osaka (JP)

(72) Inventors: Kensuke Ishida, Osaka (JP); Hideki Oe, Osaka (JP); Takehiko Yoshioka, Osaka (JP); Yuki Fuji, Osaka (JP); Yasumasa Sano, Osaka (JP); Masashi Kirimura, Osaka (JP); Hiroyuki Yamaguchi, Osaka (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 17/196,322

(22) Filed: Mar. 9, 2021

(65) Prior Publication Data

US 2021/0194412 A1 Jun. 24, 2021

Related U.S. Application Data

(63) Continuation of application No. PCT/JP2019/027057, filed on Jul. 8, 2019.

(30) Foreign Application Priority Data

Sep. 10, 2018 (JP) .............................. JP2018-168586
Apr. 9, 2019 (JP) .............................. JP2019-073956

(51) Int. Cl.
*H02S 20/25* (2014.01)
*H02S 40/36* (2014.01)
*E04D 1/30* (2006.01)

(52) U.S. Cl.
CPC ................ *H02S 20/25* (2014.12); *E04D 1/30* (2013.01); *H02S 40/36* (2014.12)

(58) Field of Classification Search
CPC ............ H02S 20/25; H02S 40/36; E04D 1/30
See application file for complete search history.

(56) References Cited

U.S. PATENT DOCUMENTS

| 8,136,322 B2 * | 3/2012 | Shadwell ................. E04D 1/20 |
| | | 52/518 |
| 2001/0034982 A1 * | 11/2001 | Nagao ..................... H02S 20/23 |
| | | 52/173.3 |

(Continued)

FOREIGN PATENT DOCUMENTS

| CA | 2846540 A1 * | 9/2014 | ............. E04D 13/00 |
| CA | 2880278 A1 * | 7/2015 | ........... E04D 1/2949 |

(Continued)

OTHER PUBLICATIONS

International Search Report issued in PCT/JP2019/027057; dated Sep. 17, 2019.

*Primary Examiner* — Babajide A Demuren
(74) *Attorney, Agent, or Firm* — Studebaker & Brackett PC

(57) ABSTRACT

First and second engaging members (15) each including an engaging portion (15n) are attached to a ridge-side end of each of first through third solar cell panels (11) and are disposed with an interval in a beam direction. First and second engaged members (21) each including an engaged portion (21i) are attached to an eaves-side end of each solar cell panel (11) and are disposed with an interval in the beam direction. The engaging portion (15n) of the first engaging member (15) of the first solar cell panel (11) is engaged with the engaged portion (21i) of the first engaged member (21) of the second solar cell panel (11), whereas the engaging portion (15n) of the second engaging member (15) of the first solar cell panel (11) is engaged with the engaged portion (21i) of the second engaged member (21) of the third solar cell panel (11).

7 Claims, 24 Drawing Sheets

(56) References Cited

U.S. PATENT DOCUMENTS

| | | | |
|---|---|---|---|
| 2003/0034064 A1 | 2/2003 | Hatsukaiwa et al. | |
| 2003/0154666 A1* | 8/2003 | Dinwoodie | E04D 1/30 |
| | | | 52/173.3 |
| 2004/0221886 A1* | 11/2004 | Oono | F24S 25/61 |
| | | | 136/251 |
| 2004/0244827 A1 | 12/2004 | Hatsukaiwa et al. | |
| 2006/0032527 A1* | 2/2006 | Stevens | H01L 31/048 |
| | | | 136/251 |

FOREIGN PATENT DOCUMENTS

| JP | 2004-308409 A | 11/2004 |
|---|---|---|
| JP | 3660520 B2 | 6/2005 |
| JP | 4759904 B2 | 8/2011 |

* cited by examiner

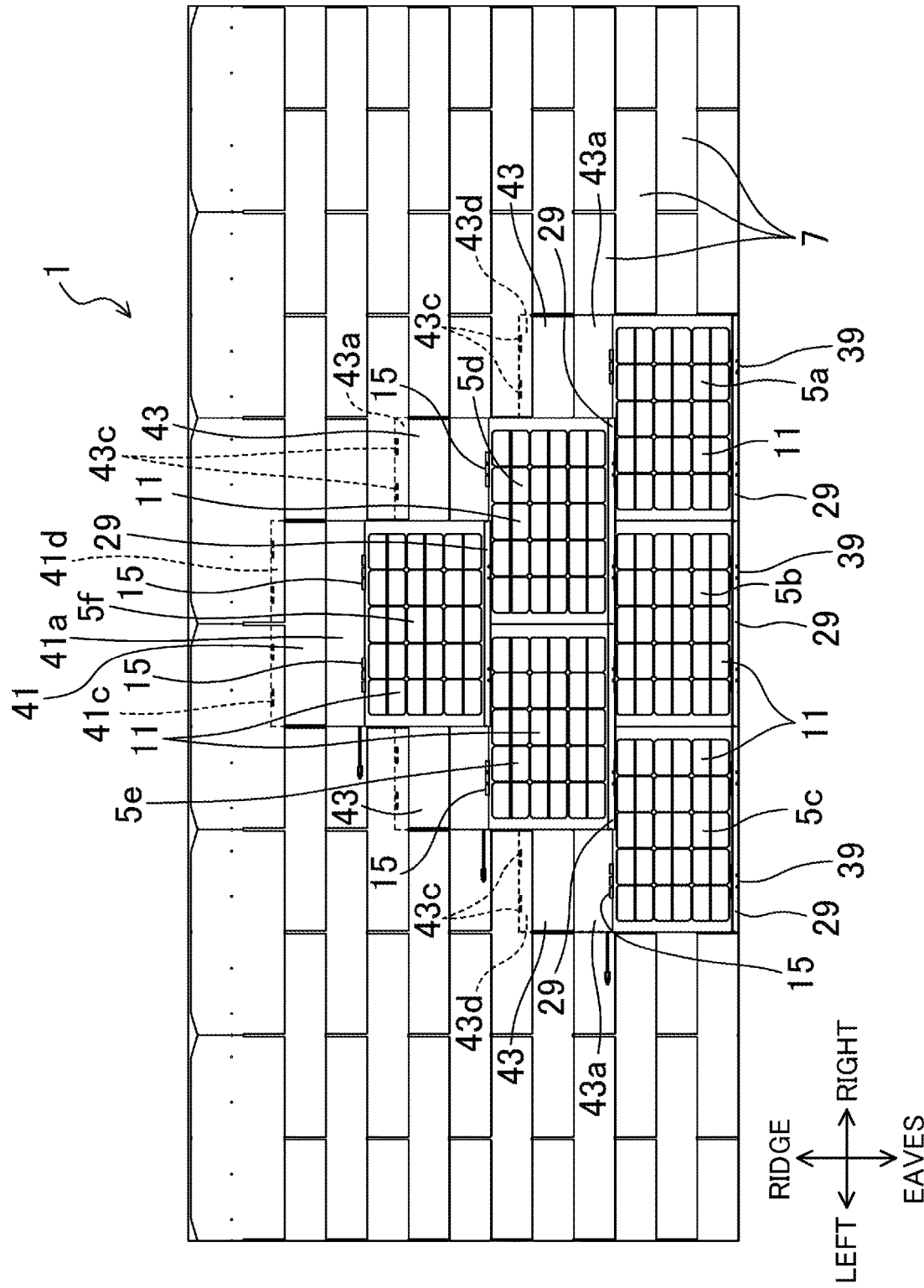

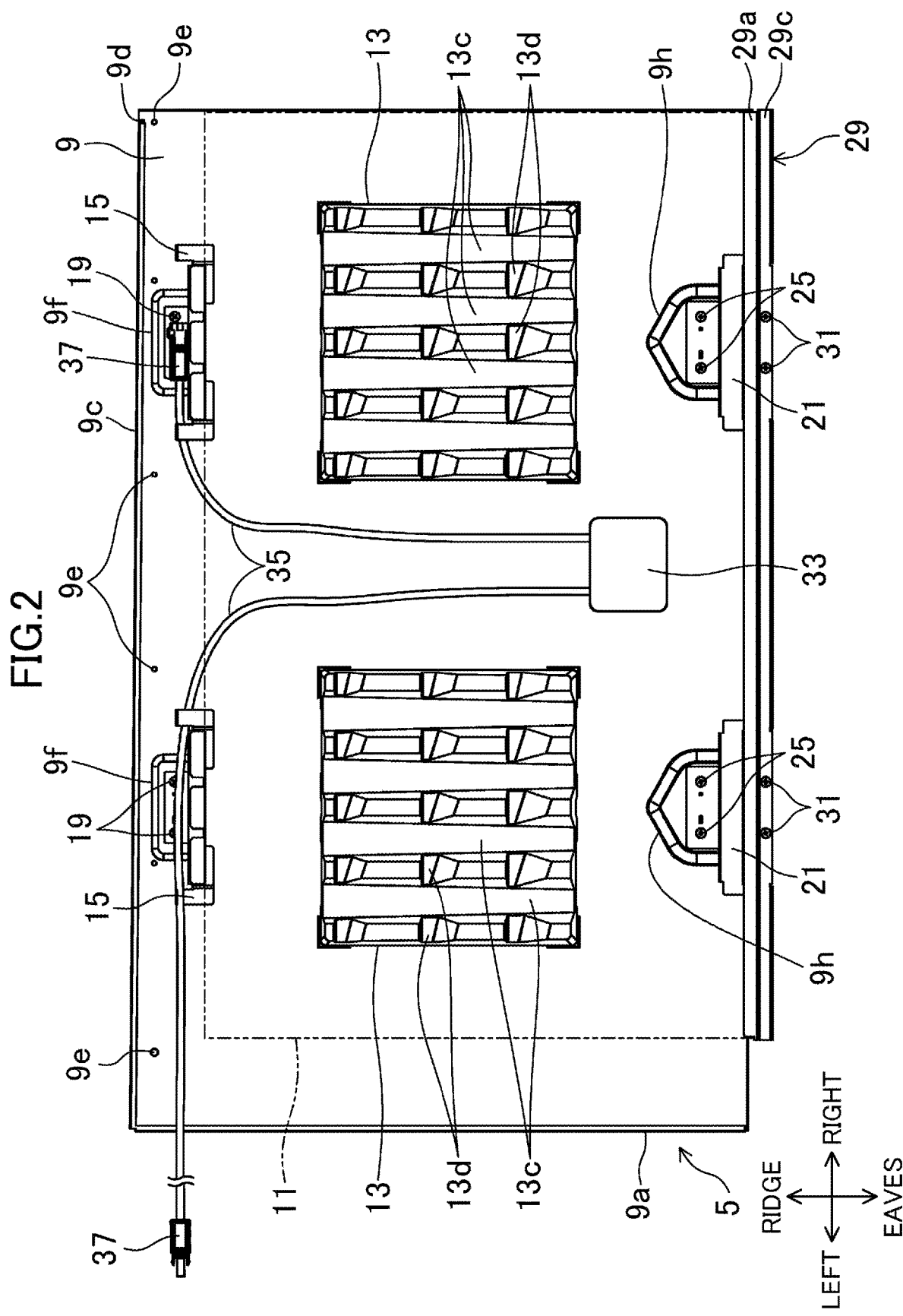

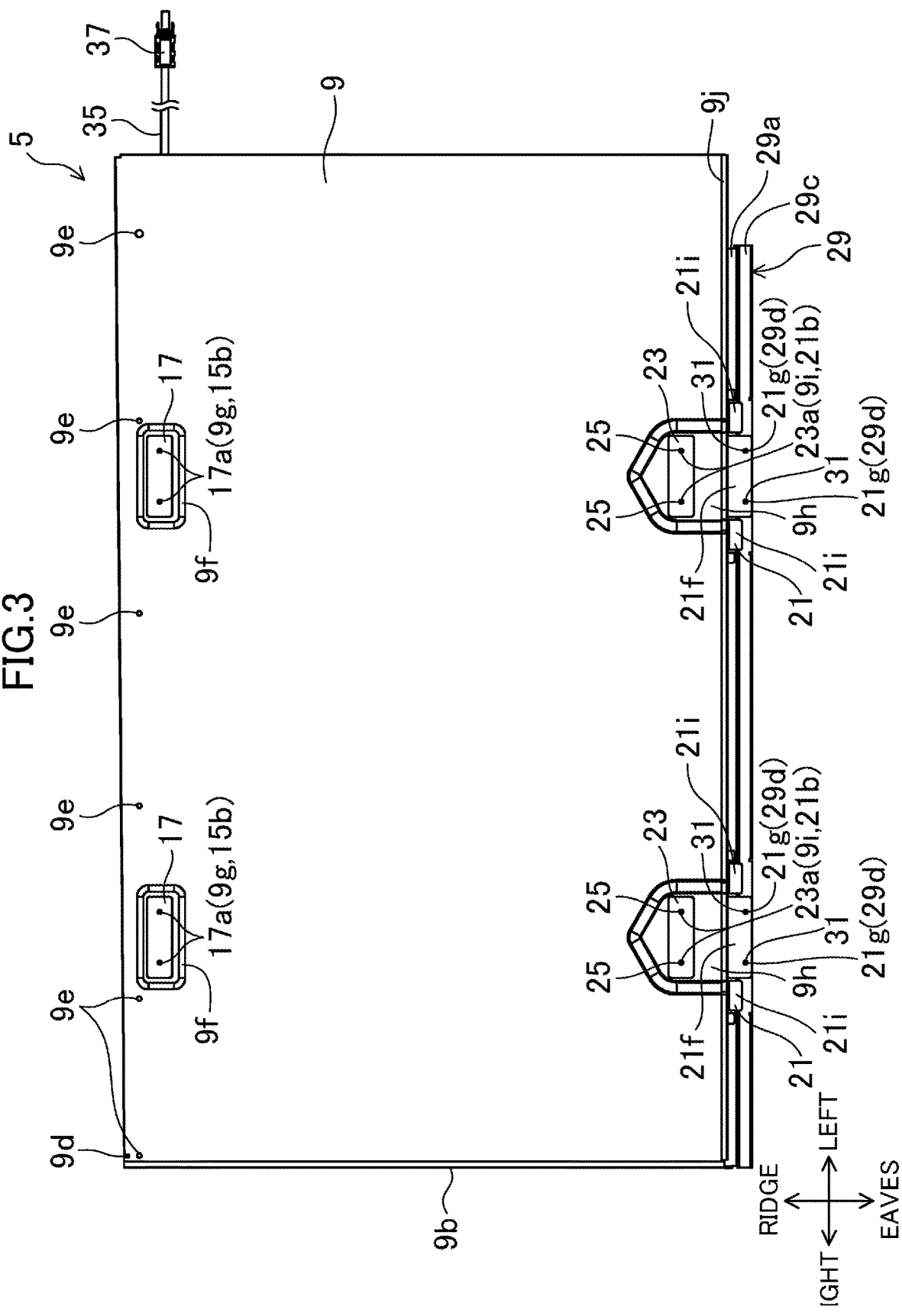

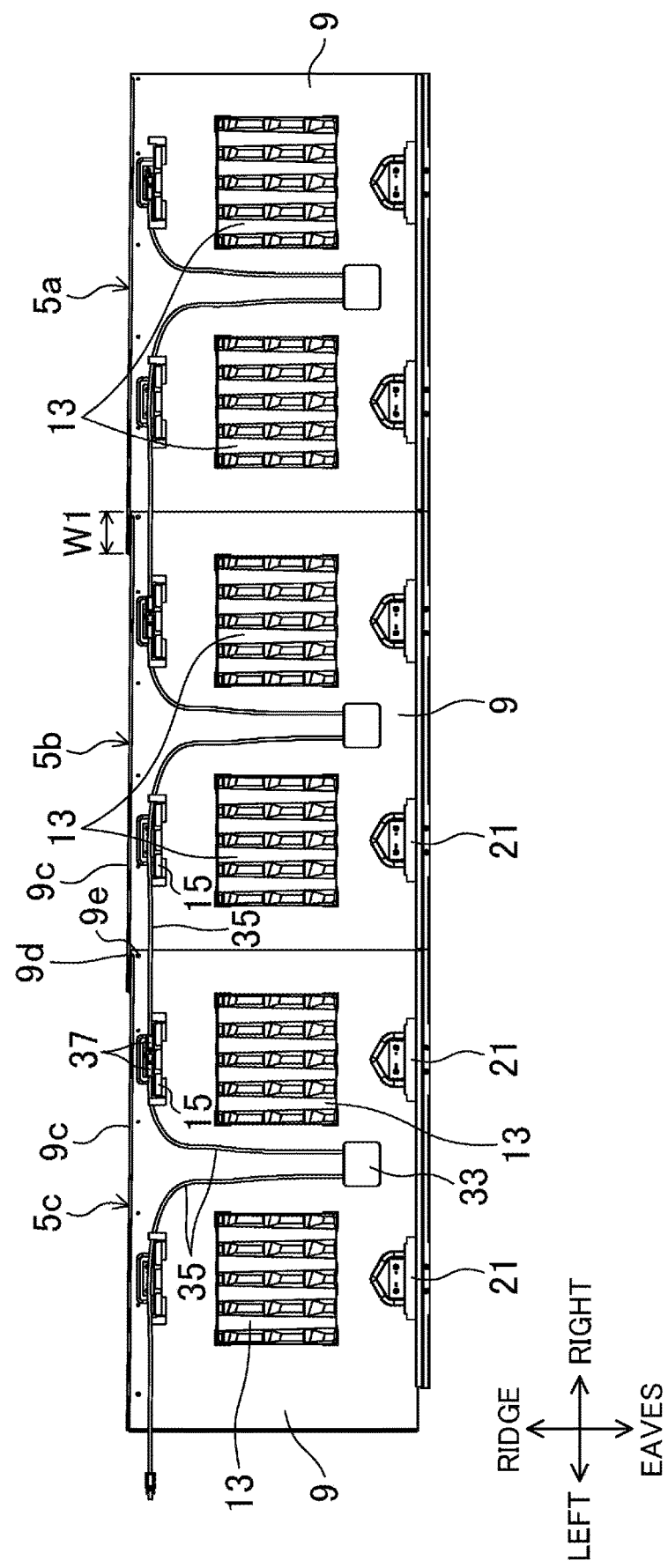

INSTALLATION STRUCTURE OF SOLAR CELL PANEL

CROSS-REFERENCE TO RELATED APPLICATION

This is a continuation of PCT International Application PCT/JP2019/027057 filed on Jul. 8, 2019, which claims priority to Japanese Patent Applications No. 2018-168586 filed on Sep. 10, 2018 and No. 2019-073956 filed on Apr. 9, 2019. The disclosures of these applications including the specifications, the drawings, and the claims are hereby incorporated by reference in their entirety.

TECHNICAL FIELD

The present invention relates to an installation structure in which a plurality of solar cell panels are arranged on a roof surface such that solar cell panels adjacent to each other in an eaves-ridge direction are displaced from each other in a beam direction.

BACKGROUND ART

Patent Document 1 describes an installation structure in which a plurality of solar cell panels are arranged on a roof surface such that solar cell panels adjacent to each other in an eaves-ridge direction are displaced from each other in a beam direction.

CITATION LIST

Patent Document

PATENT DOCUMENT 1: Japanese Patent No. 3660520

SUMMARY OF THE INVENTION

Technical Problem

In an installation structure of solar cell panels as described in Patent Document 1, there has been a demand for easing positioning of the solar cell panels in a beam direction.

The present invention has been made in view of the foregoing circumstances, and has an object of easing positioning of solar cell panels in a beam direction.

Solution to the Problem

The present invention can provide an installation structure of solar cell panels in which first through third solar cell panels are disposed on a roof surface such that the first solar cell panel is adjacent to an eaves side of each of the second and third solar cell panels, first and second engaging members each including an engaging portion are attached to a ridge-side end of each of the solar cell panels, the first and second engaging members being disposed with an interval in a beam direction, first and second engaged members each including an engaged portion are attached to an eaves-side end of each of the solar cell panels, the first and second engaged members being disposed with an interval in a beam direction, and the engaging portion of the first engaging member of the first solar cell panel is engaged with the engaged portion of the first engaged member of the second solar cell panel, whereas the engaging portion of the second engaging member of the first solar cell panel is engaged with the engaged portion of the second engaged member of the third solar cell panel.

Advantages of the Invention

According to the present invention, the first solar cell panel is positioned relative to the second solar cell panel in the beam direction only by engaging the engaging portion of the first engaging member of the first solar cell panel with the engaged portion of the first engaged member of the second solar cell panel. The first solar cell panel is positioned relative to the third solar cell panel in the beam direction only by engaging the engaging portion of the second engaging member of the first solar cell panel with the engaged portion of the second engaged member of the third solar cell panel. Accordingly, positioning of solar cell panels in the beam direction can be easily performed.

BRIEF DESCRIPTION OF THE DRAWINGS

FIG. 1A is a plan view illustrating a roof surface to which an installation structure of solar cell panels according to a first embodiment is applied.

FIG. 2 is a view illustrating a building material-integrated solar cell module, when seen from the front side of the roof surface.

FIG. 3 is a view of the building material-integrated solar cell module when seen from the back side of the roof surface.

FIG. 5 is a front view three building material-integrated solar cell modules that are adjacent to one another in a beam direction in a state where the solar cell panels are detached.

DESCRIPTION OF EMBODIMENTS

Embodiments of the present invention will be described hereinafter with reference to the drawings.

First Embodiment

Figure 1B:
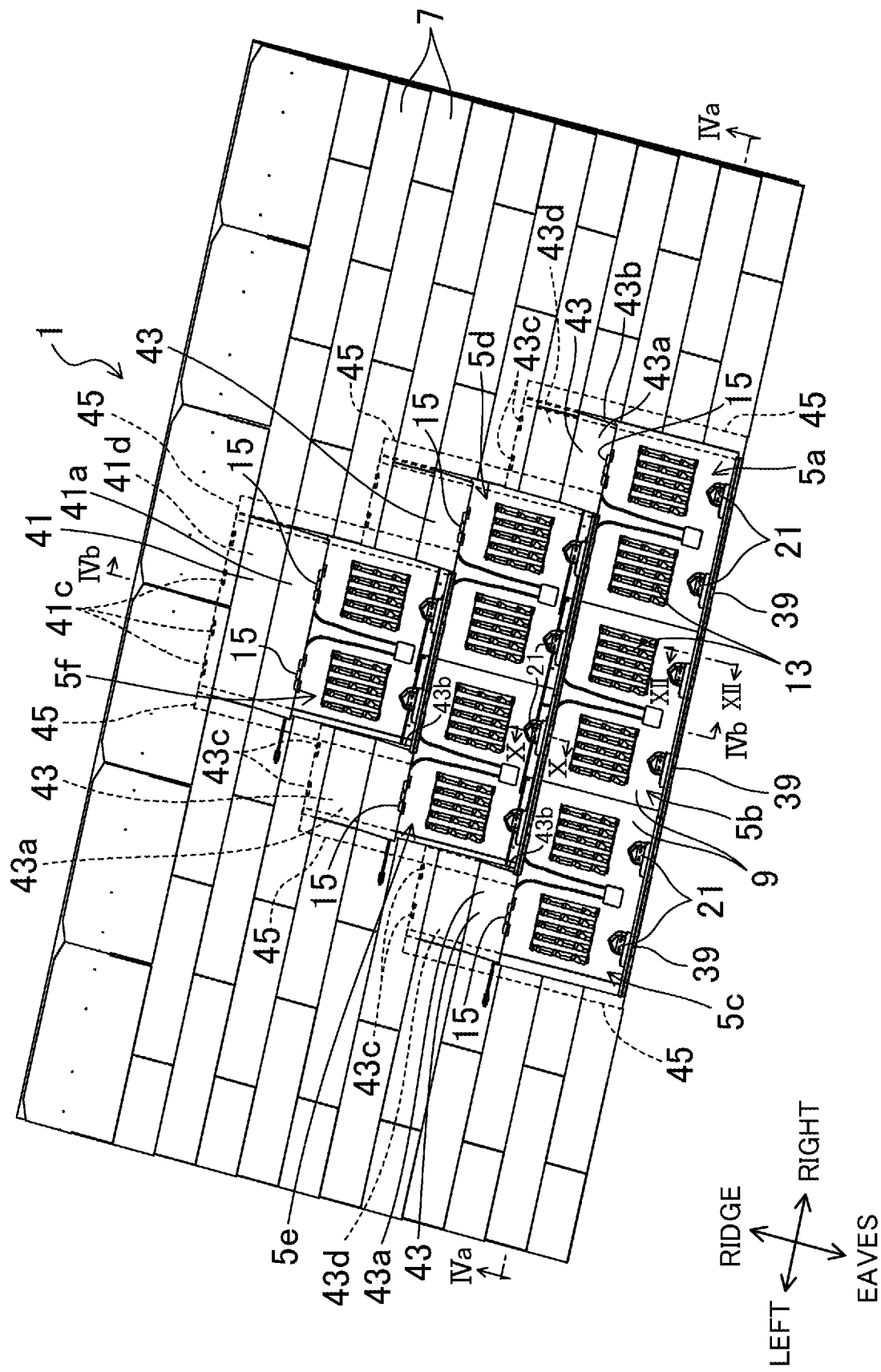
FIG. 1B is a perspective view illustrating the roof surface from which the solar cell panels are detached.

FIGS. 1A and 1B illustrate one of a pair of roof surfaces 1 constituting a hip roof. Each of the roof surfaces 1 includes a roof substrate 3 (see FIG. 10) constituted by a sheathing 3a (see FIG. 10) and a waterproof sheet 3b (see FIG. 10). That is, a surface of the sheathing 3a is entirely covered with the waterproof sheet 3b. A front side when the roof surface 1 is seen from outside, that is, a side facing the sun, will be hereinafter referred to as a front side, and the opposite side will be hereinafter referred to as a back side. A direction orthogonal to an eaves-ridge direction when seen from the front side of the roof surface 1 will be referred to as a beam direction. The right side when seen from the front side of the roof surface 1 (i.e., the right in FIG. 1A) will be referred to as a right side, and the left side when seen from the front side of the roof surface 1 (i.e., the left in FIG. 1A) will be referred to as a left side.

On a center (partial) region of the surface of the roof substrate 3 in the beam direction, six building material-integrated solar cell modules 5a to 5f are constructed. Specifically, at the eaves-side end of the surface of the roof substrate 3, the building material-integrated solar cell modules 5a to 5c are disposed in this order from the right in a center portion in the beam direction. At the ridge side of the building material-integrated solar cell modules 5a to 5c, the building material-integrated solar cell modules 5d and 5e are disposed in this order from the right, and the solar cell module 5f is constructed at the ridge side of the solar cell modules 5d and 5e. The building material-integrated solar cell modules 5a to 5f have a common structure, and thus, these modules will be denoted by reference numeral 5 when these modules do not need to be distinguished. In regions where the building material-integrated solar cell modules 5a to 5f are not constructed, a plurality of slates 7 are constructed.

<Configuration of Solar Cell Module>

As also illustrated in FIGS. 2 and 3, each building material-integrated solar cell module 5 includes a base plate 9 having a trapezoidal shape in plan view and formed of a plated steel sheet as an incombustible material, and a solar cell panel 11 to which an installation structure according to a first embodiment of the present invention is applied and which is disposed at the front side of the base plate 9. As the incombustible material constituting the base plate 9, a metal except for the plated steel sheet, such as aluminium or stainless, may be employed. In FIG. 2, the solar cell panels 11 are denoted by chain double-dashed lines.

—Base Plate—

Figure 4A:
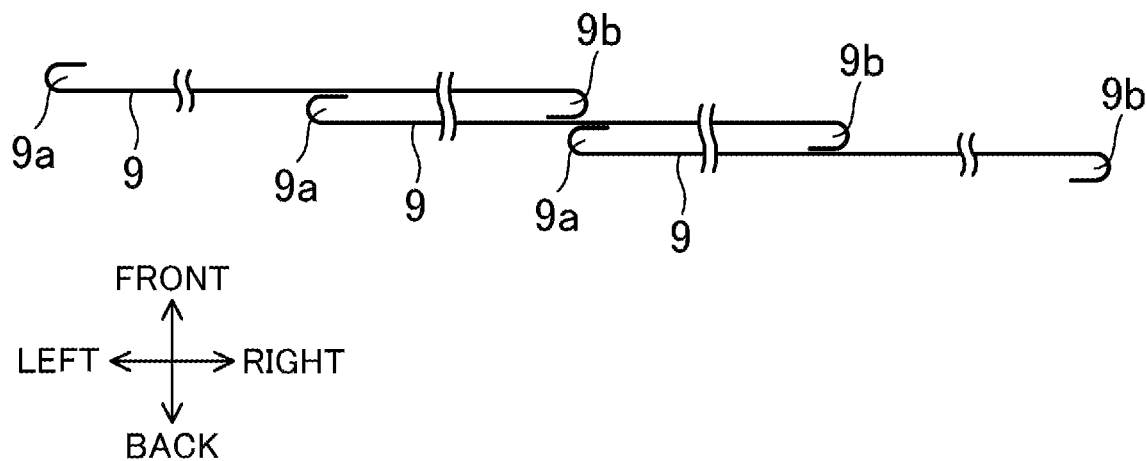
FIG. 4A is a cross-sectional view of a base plate taken along line IVa-IVa in FIG. 1B.

As illustrated in FIG. 4A, a left bent portion 9a that is bent toward the front side to form a U shape in cross section is formed at one end (left end) of the base plate 9 in the beam direction. The left bent portion 9a serves as a back board for preventing water on the base plate 9 from entering to the left outer side. On the other hand, a right bent portion 9b that is bent toward the back side to form a U shape in cross section is formed at the other end (right end) of the base plate 9 in the beam direction.

Figure 4B:
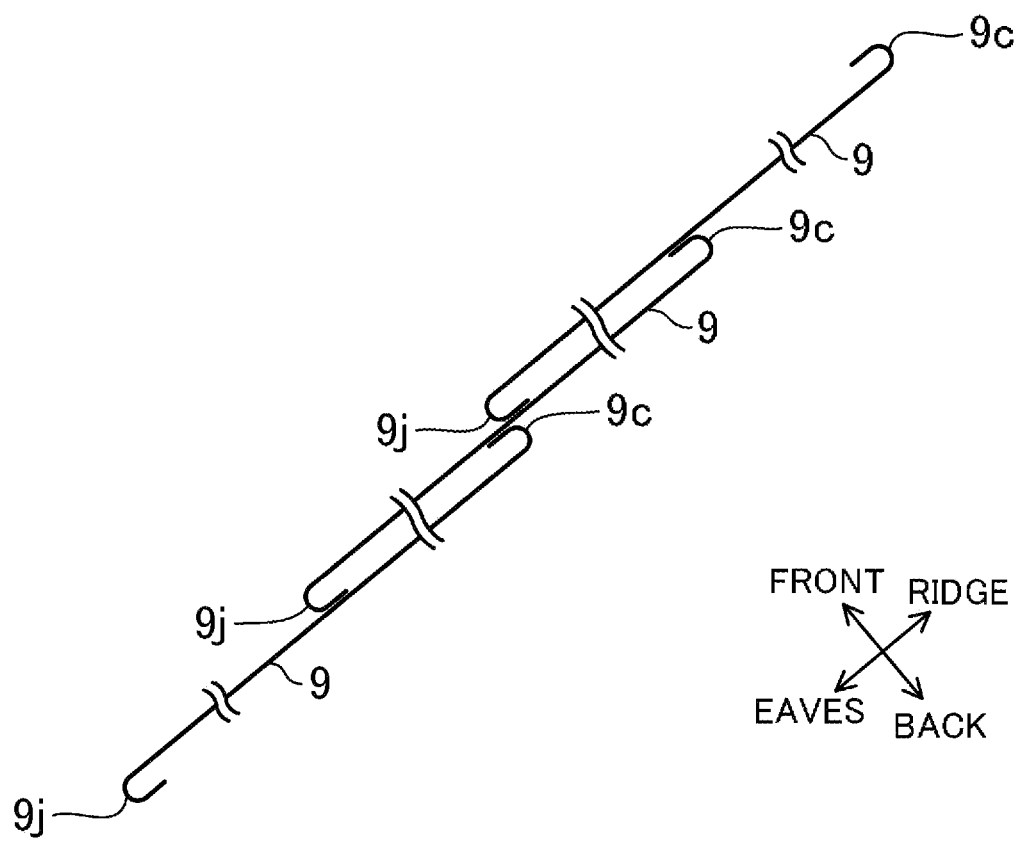
FIG. 4B is a cross-sectional view of the base plate taken along line IVb-IVb in FIG. 1B.

As illustrated in FIG. 4B, a ridge-side bent portion 9c that is bent toward the front side to form a U shape in cross section is formed at one end (ridge-side end) of the base plate 9 in the eaves-ridge direction, and extends over the entire length except for the right end. The ridge-side bent portion 9c serves as a back board for preventing water on the base plate 9 from flowing outward in the ridge direction. On the other hand, an eaves-side bent portion 9j that is bent toward the back side to form a U shape in cross section is formed at the other end (eaves-side end) of the base plate 9 in the eaves-ridge direction.

In FIG. 4A, the left bent portion 9a and the right bent portion 9b are bent to form U shapes in cross section, but the present invention is not limited to this example. For example, each of the left bent portion 9a and the right bent portion 9b may be bent to form an L shape in cross section, or may be folded to be completely crushed in the front-back direction. Similarly, each of the ridge-side bent portion 9c and the eaves-side bent portion 9j (see FIG. 4B) is not limited to the U shape in cross section, and may also be bent to form an L shape in cross section or may be folded to have a shape crushed in the front-back direction.

As illustrated in FIG. 5, the eaves side (edge) of the base plate 9 extends substantially horizontally, whereas the ridge side (edge) of the base plate 9 tilts to one side in the beam direction (to the right in FIG. 5) toward the eaves with respect to the eaves side of the base plate. Accordingly, even in a case where the building material-integrated solar cell modules 5 are arranged side by side in the beam direction with end portions of the base plates 9 in the beam direction overlapping with one another, the ridge-side bent portions 9c do not overlap with each other, and steps in the thickness direction are hardly formed between the base plates 9.

A U-shaped notch 9d is formed in a portion of the ridge-side edge of each base plate 9 adjacent to the right of the ridge-side bent portion 9c. Six ridge-side attachment holes 9e are formed to penetrate portions of the base plate 9 near the ridge-side edge, and are arranged with intervals in the beam direction.

A pair of ridge-side bulges 9f bulging to the front side is disposed with an interval in the beam direction on the ridge-side end of the base plate 9. Each of the ridge-side bulges 9f has a rectangular shape elongated in the beam direction in plan view. Each of the ridge-side bulges 9f has a pair of ridge-side screw insertion holes 9g disposed with an interval in the beam direction. A pair of eaves-side bulges 9h bulging to the front side and open to the eaves side is disposed with an interval in the beam direction on portions of lower ends of the base plate 9 opposite to the ridge-side bulges 9f in the eaves-ridge direction (flow direction). Each of the eaves-side bulges 9h has an approximately pentagon shape in which a ridge-side end portion is gradually tapered toward the ridge side and a region except for an upper end portion extends with a constant width in the eaves-ridge direction in plan view. Each of the eaves-side bulges 9h has a pair of eaves-side screw insertion holes 9i disposed with an interval in the beam direction. A bulging height H1 (see FIG. 10) of each of the eaves-side bulges 9h is larger than a bulging height H2 (see FIG. 10) of each of the ridge-side bulges 9f.

—Cushioning Member—

On the front face of each base plate 9 (the face toward the roof substrate 3), two substantially plate-shaped cushioning members 13 each having a rectangular shape in plan view are disposed to be spaced from each other with the plate faces extending along the front face of the base plate 9, and are disposed with a spacing with the outer peripheral edge of the base plate 9. The cushioning member 13 is made of a resin having at least one of a shock absorbing function or a heat insulating function, such as polystyrene foam.

Figure 6:
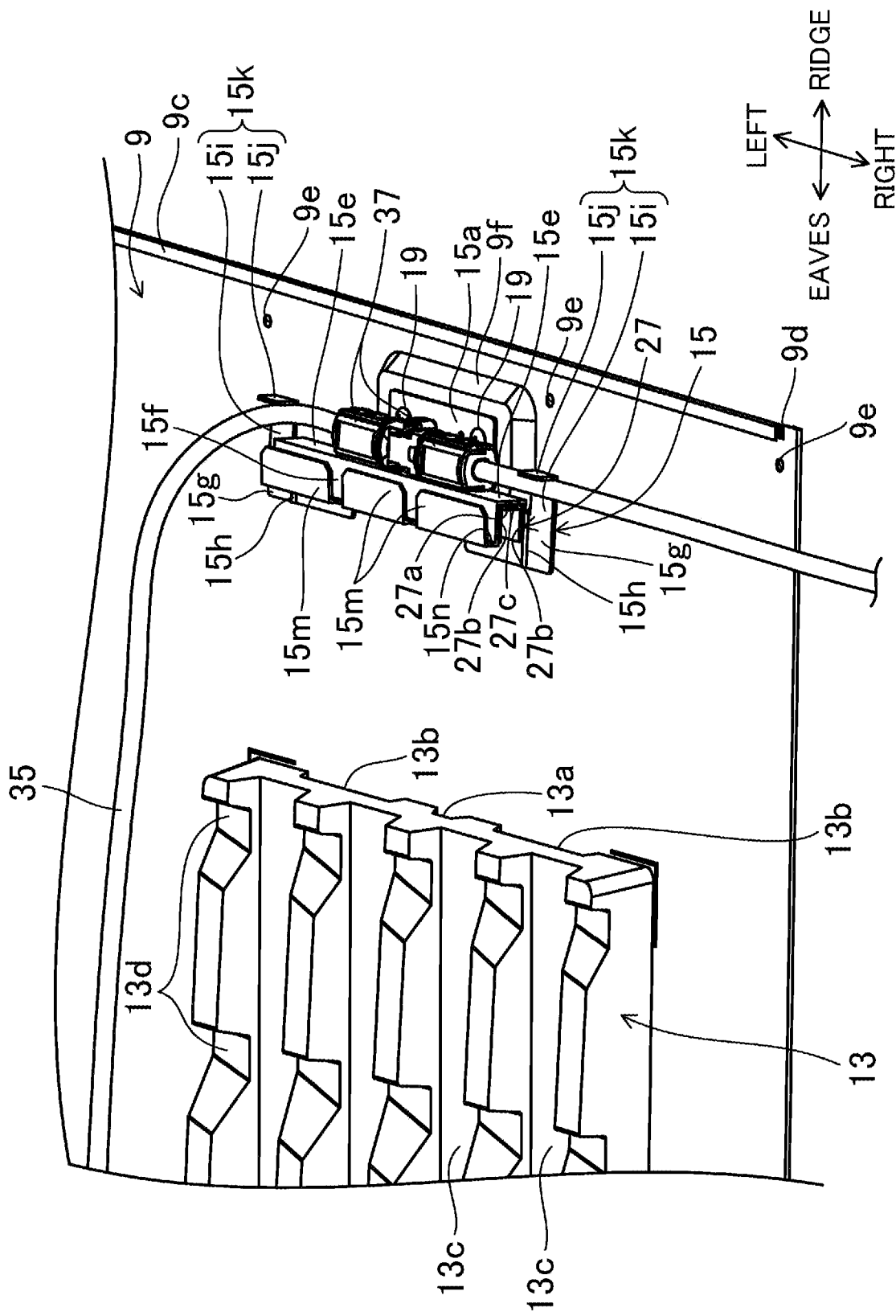
FIG. 6 is a perspective view of a cable, a ridge-side frame member, a gasket, and a portion of the base plate around the ridge-side frame member.

As illustrated in FIG. 6, on the back face of the cushioning member 13, a first back-side groove 13a and two second back-side grooves 13b are formed with intervals in the beam direction. Each of the first and second back-side grooves 13a and 13b has a shallow pan shape in plan view that gradually increases in width toward the back side, and extends over the entire length in the eaves-ridge direction. Accordingly, spaces each having a trapezoidal shape in cross section, extending in the eaves-ridge direction, and used for allowing rain water or the like to pass therethrough are formed between the first back-side groove 13a and the base plate 9 and between the base plate 9 and the second back-side grooves 13b. The shape, number, and arrangement, for example, of the first grooves (the first back-side groove 13a and the two second back-side grooves 13b) are not specifically limited. For example, each of the first grooves may have other shapes such as a semicircular shape in cross section. FIG. 6 shows an example in which the first back-side groove 13a is sandwiched between the two second back-side grooves 13b in the beam direction and the first back-side groove 13a is narrower than the second back-side grooves 13b.

On the other hand, on the front face of the cushioning member 13, four first front-side grooves 13c are formed with intervals in the beam direction. Each of the first front-side grooves 13c has a shallow pan shape in plan view that gradually increases in width toward the front side, and extends over the entire length in the beam direction. Accordingly, a space having a trapezoidal shape in cross section and extending in the eaves-ridge direction is formed between the solar cell panel 11 and each of the first front-side grooves 13c. In other words, the front face of the cushioning member 13 has five regions where the first front-side grooves 13c are not formed (hereinafter referred to as non-formation regions where no first front-side grooves 13c are formed) elongated in the eaves-ridge direction, and these non-formation regions support intermediate portions of the solar cell panel 11 in the beam direction and the eaves-ridge direction. Accordingly, air permeability is obtained at the back side of the solar cell panels 11 so that a temperature rise of the solar cell panels 11 can be reduced. The number of non-formation regions without the first front-side grooves 13c is not limited to five, and may be four or less or six or more, depending on, for example, the size of the cushioning member 13.

On the non-formation regions where no first front-side grooves 13c are formed, three second front-side grooves 13d are formed with intervals in the eaves-ridge direction, and each has a shallow pan shape in plan view that gradually increases in width toward the front side and extends over the entire length in the beam direction. Accordingly, a space having a trapezoidal shape in cross section and extending in the beam direction is formed between the solar cell panel 11 and each of the second front-side grooves 13d.

The shape, number, and arrangement of grooves formed on the front face of the cushioning member 13 are not limited to those of the first front-side grooves 13c and the second front-side grooves 13d described above.

From the viewpoint of smoothly draining water on the front face of the cushioning member 13, eaves-side walls of the second front-side grooves 13d are tilted in the eaves direction to one side in the beam direction (to the right in FIG. 2), and the depth of the first front-side grooves 13c is larger than the depth of the second front-side grooves 13d.

A region on the back face of the cushioning member 13 where none of the first back-side groove 13a and the second back-side grooves 13b are formed is bonded to the front face of the base plate 9 with a double face tape. A region on the front side face of the cushioning member 13 where none of the first front-side grooves 13c and the second front-side grooves 13d is formed is not bonded to the back face of the solar cell panel 11.

—Ridge-Side Frame Member—

Figure 7:
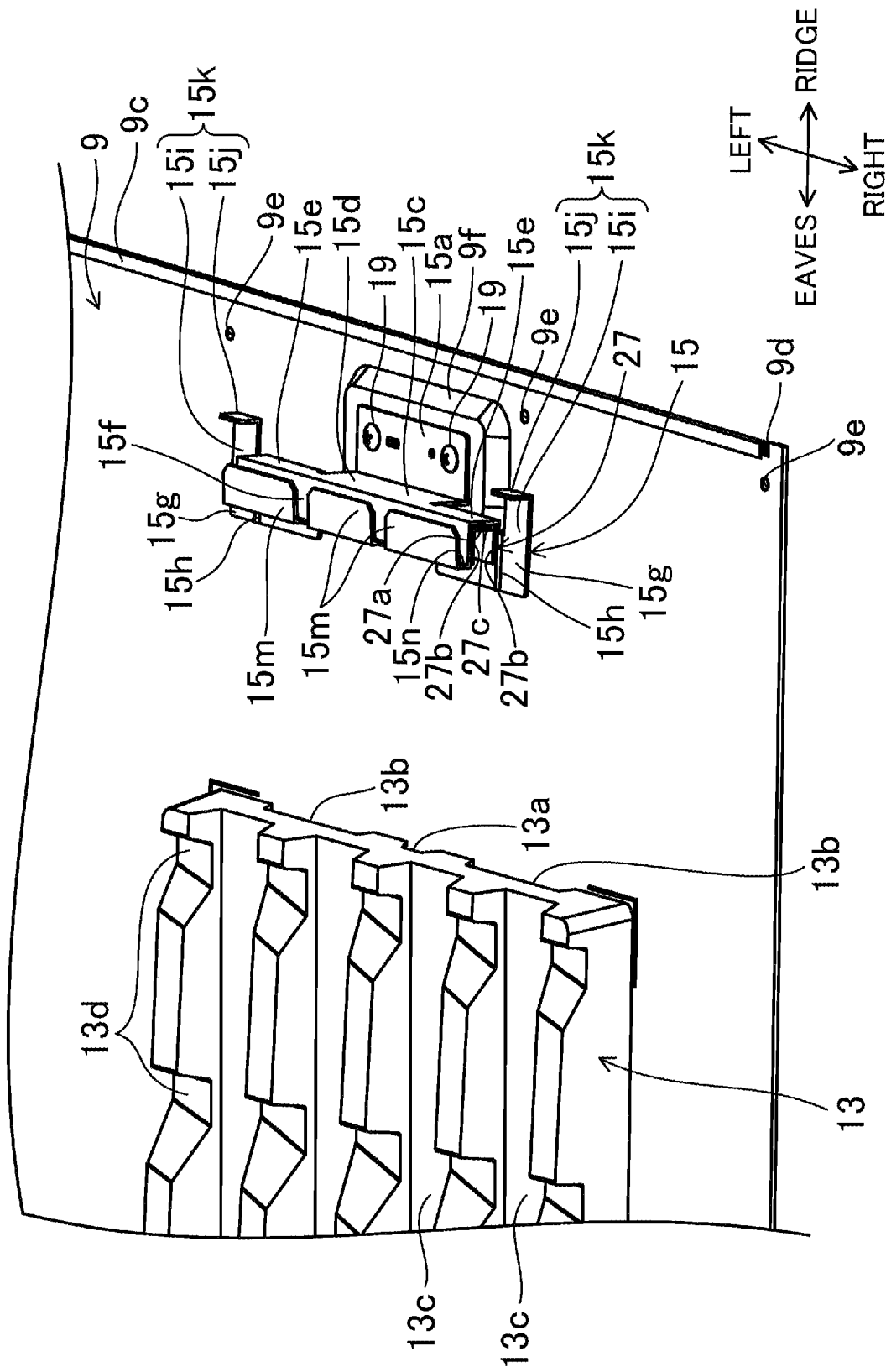
FIG. 7 is a perspective view of the ridge-side frame member, the gasket, and the portion of the base plate around the ridge-side frame member.

As also illustrated in FIG. 7, metal ridge-side frame members 15 serving as an engaging member and supporting ridge-side ends of the solar cell panels 11 are attached to the front sides of the ridge-side bulges 9f of the base plates 9, and are arranged with intervals in the beam direction. Rectangular ridge-side auxiliary plates 17 are attached to the back side of each ridge-side bulge 9f at positions corresponding to the ridge-side frame members 15 from the back side (see FIG. 3). Each of the ridge-side auxiliary plates 17 has a pair of ridge-side fastening holes 17a disposed with an interval in the longitudinal direction.

Each ridge-side frame member 15 includes an attachment portion 15a having a rectangular plate shape in plan view, having one side in contact with the base plate 9, and extending in the beam direction. The attachment portion 15a includes a pair of ridge-side screw holes 15b (see FIG. 3) disposed with an interval in the longitudinal direction (beam direction) and corresponding to the ridge-side screw insertion holes 9g of the base plate 9. A plate-shaped elevation portion 15c projecting to the front side of the base plate 9 with the plate face thereof oriented in the eaves-ridge direction is integrally formed on the eaves-side edge of the attachment portion 15a extending in the longitudinal direction. The elevation portion 15c has an approximately T shape in plan view constituted by a center portion 15d having the same width as that of the attachment portion 15a, and a pair of expansion portions 15e expanding to both sides in the beam direction from a portion of the center portion 15d except for a base portion. A first holding wall 15f projecting toward the eaves side is integrally formed on the distal edge of the elevation portion 15c, that is, on the center portion 15d and the distal edge of the elevation portion 15c of the expansion portions 15e. At the proximal edge of the elevation portion 15c of each end edge expansion portion 15e, a second holding wall 15g as a ridge-side contact face integrally projects to face the first holding wall 15f and jut out from the first holding wall 15f to both outer sides in the beam direction. On portions of the second holding wall 15g facing both edges of the first holding wall 15f in the beam direction, rib portions 15h as ridge-side projections extending in the eaves-ridge direction integrally project toward the front side. On portions of the second holding wall 15g jutting outward in the beam direction, expansion walls 15i expanding to the ridge side are integrally formed to be flush with the second holding walls 15g, and projecting strip portions 15j integrally project from the front ends of the expansion walls 15*i* toward the front side. The expansion walls 15*i* and the projecting strip portions 15*j* constitute cable hooks 15*k* for holding a cable at a predetermined height. Three bent walls 15*m* projecting to the front side and bent toward the ridge side integrally project from the front edge of the first holding wall 15*f* and are arranged with intervals in the beam direction. The bent walls 15*m* and the first holding wall 15*f* form grooves 15*n* that extend in the beam direction, are open to the ridge side, and serve as engagement portions.

The ridge-side frame members 15 configured as described above are fastened to the base plate 9 by sequentially inserting screws 19 in the ridge-side screw holes 15*b* of the attachment portions 15*a* of the ridge-side frame members 15, the ridge-side screw insertion holes 9*g* of the base plate 9, and the ridge-side fastening holes 17*a* of the ridge-side auxiliary plates 17 from the front side.

—Eaves-Side Frame Member—

Figure 8:
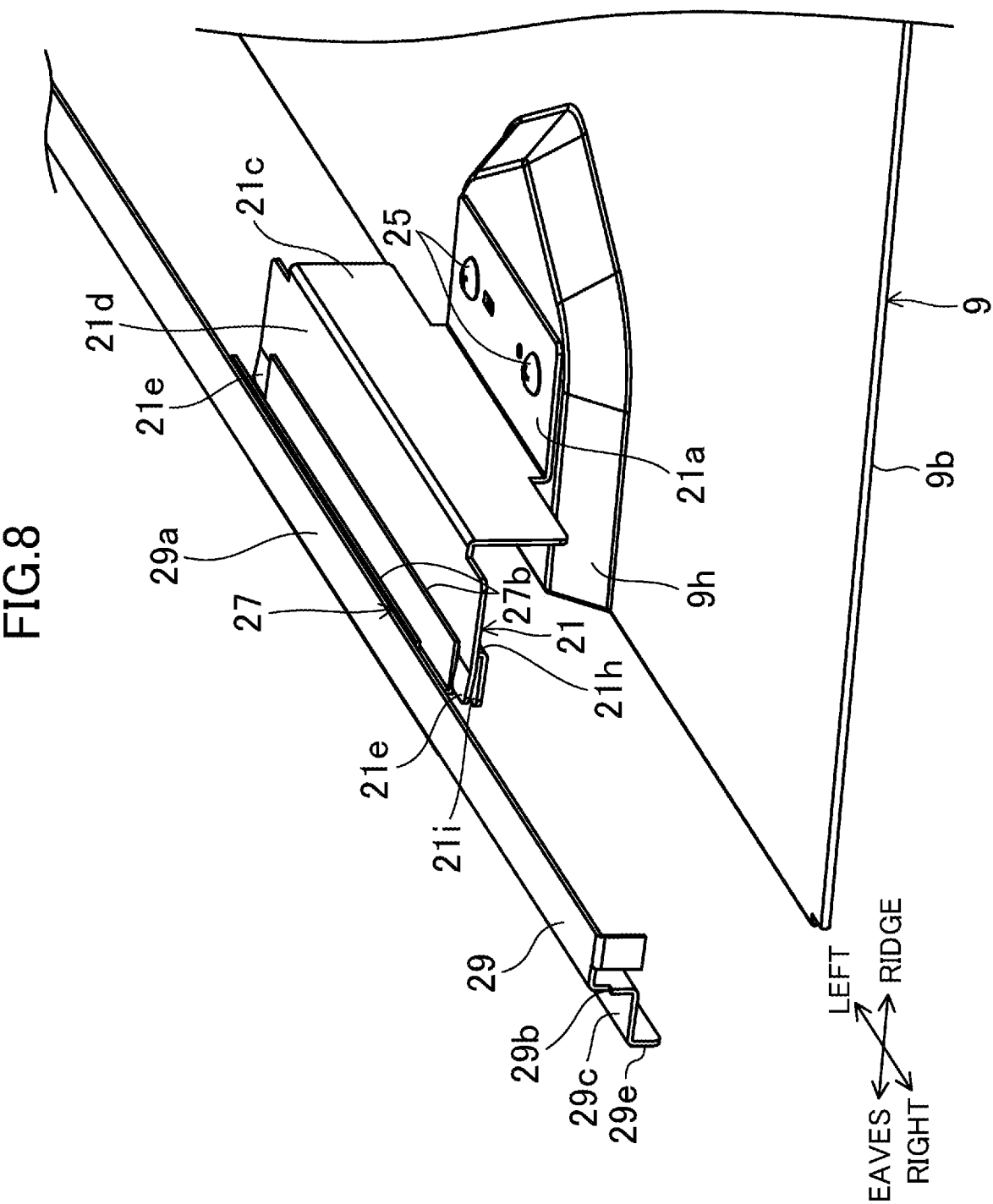
FIG. 8 is a perspective view of an eaves-side frame member, a gasket, a cover member, and a portion of the base plate around the eaves-side frame member.
Figure 9:
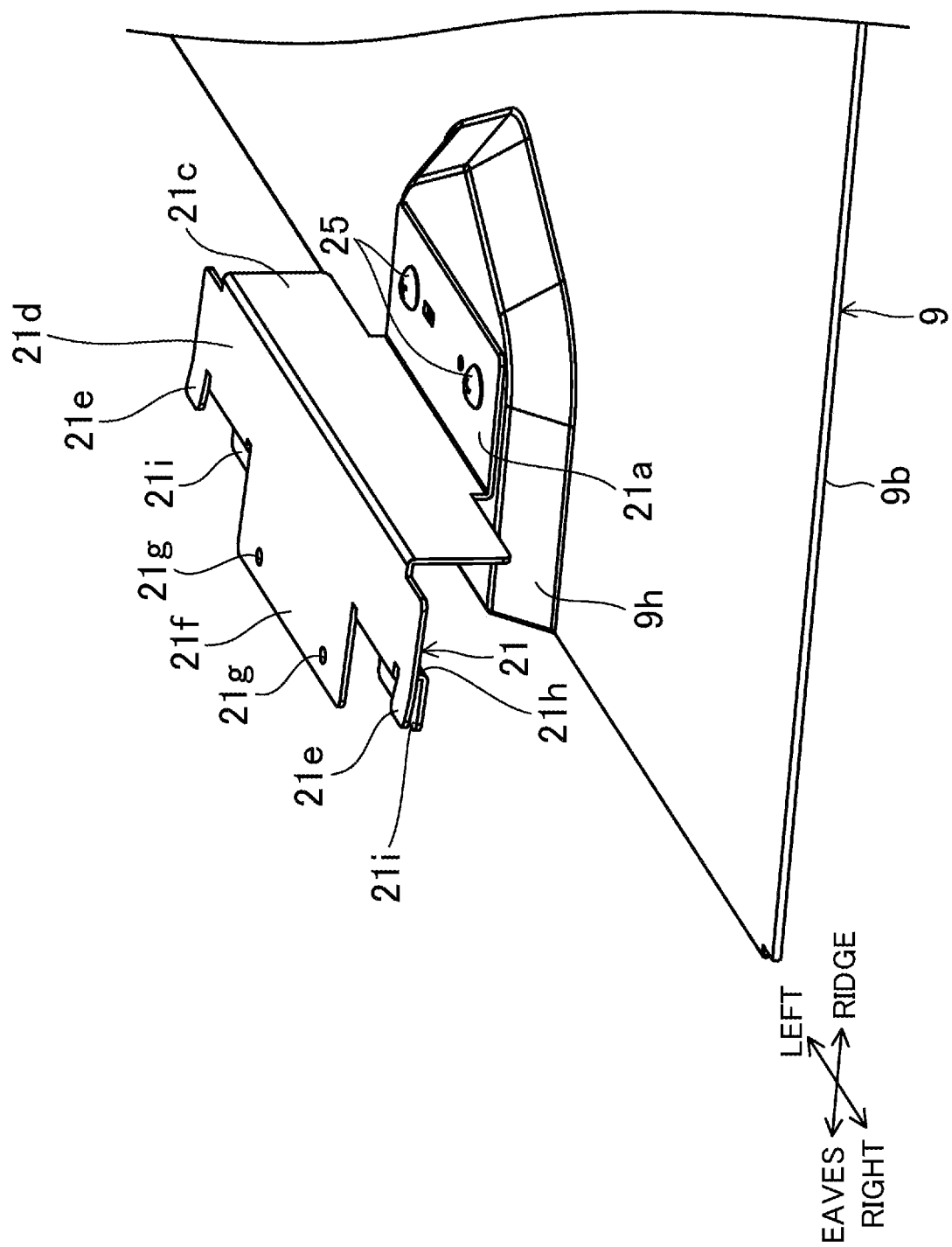
FIG. 9 is a perspective view of the eaves-side frame member, and a portion of the base plate around an eaves-side frame member.

As illustrated in FIGS. 8 and 9, a metal eaves-side frame member 21 serving as an engaged member and supporting an eaves-side end of the solar cell panel 11 is attached to each of eaves-side bulge 9*h* of the base plate 9 at a position facing the ridge-side frame member 15 in the eaves-ridge direction with an interval in the beam direction. As a position corresponding to the ridge-side frame member 15, a rectangular eaves-side auxiliary plate 23 is attached to the back side of each eaves-side bulge 9*h* (see FIG. 3). The eaves-side auxiliary plate 23 has a pair of eaves-side fastening holes 23*a* with an interval in the longitudinal direction.

The eaves-side frame member 21 includes a plate-shaped attachment wall 21*a* having one face in contact with the base plate 9, elongated in the beam direction, and having a rectangular shape in plan view. The attachment wall 21*a* has a pair of eaves-side screw holes 21*b* (see FIG. 3) corresponding to the eaves-side screw insertion holes 9*i* of the base plate 9 and disposed with an interval in the longitudinal direction (beam direction). A plate-shaped standing wall 21*c* projecting to the front side of the base plate 9 with the plate face thereof oriented in the eaves-ridge direction is integrally formed at the eaves-side edge of the attachment wall 21*a* of the base plate 9. The both ends of the standing wall 21*c* in the beam direction projects outward from the attachment wall 21*a* in the beam direction. A long plate portion 21*d* having an approximately rectangular shape in plan view and having a plate face oriented in the front-back direction integrally projects on the front edge of the standing wall 21*c* with both longitudinal ends thereof jutting out from the standing wall 21*c* in the beam direction. A pair of plate-shaped projecting walls 21*e* serving as an eaves-side projection integrally projects from both ends, in the beam direction, of the front edge of the long plate portion 21*d*, and tilts to the front side toward the eaves side. Accordingly, the proximal ends of the projecting walls 21*e* are slightly bent. A plate-shaped center wall 21*f* serving as a plate-shaped eaves-side contact face integrally projects from a center portion, in the beam direction, of the front edge of the long plate portion 21*d* toward the eaves side, and is disposed with an interval from the projecting walls 21*e*. A pair of frame-side through holes 21*g* is disposed with an interval in the beam direction near the front end of the center wall 21*f*. A plate-shaped step-forming plane portion 21*h* integrally projects to the back side between a portion from which the projecting walls 21*e* projects and a portion from which the center wall 21*f* projects on the front edge of the long plate portion 21*d*. A projecting strip 21*i* serving as an engaged portion and extending in the beam direction and projecting to the eaves side integrally projects from the front end of the step-forming plane portion 21*h*. Relative positions of the projecting strips 21*i* of the right eaves-side frame member 21 and the groove 15*n* of the right ridge-side frame member 15 relative to the solar cell panel 11 in the beam direction are identical, and relative positions of the projecting strips 21*i* of the left eaves-side frame member 21 and the groove 15*n* of the left ridge-side frame member 15 relative to the solar cell panel 11 in the beam direction are also identical.

The eaves-side frame members 21 configured as described above are fastened to the base plate 9 by sequentially inserting screws 25 in the eaves-side screw holes 21*b* of the attachment walls 21*a* of the eaves-side frame members 21, the eaves-side screw insertion holes 9*i* of the base plate 9, and the eaves-side fastening holes 23*a* of the eaves-side auxiliary plates 23, from the front side.

—Solar Cell Panel—

The solar cell panel 11 has a rectangular shape, and is disposed with the longitudinal direction thereof oriented in the beam direction. The front and back faces of the solar cell panel 11 tilt to be separated away from the front face of the base plate 9 toward the eaves side.

The solar cell panel 11 is formed in the following manner First, a transparent electrode layer of, for example, tin oxide, an optical semiconductor layer, and a back-side electrode layer of, for example, a metal, are sequentially formed on a glass substrate back side having a laterally elongated rectangular shape of 551×908 mm. These layers are patterned by, for example, laser processing, thereby forming a power generation portion and a wiring portion. After a solar cell device including such power generation portions and wiring portions are arranged, a surface on which the solar cell device is formed is sealed and protected with, for example, ethylene-vinyl acetate copolymer (EVA), a filler such as polyolefin, glass, a PET film, or a tedlar film.

—Gasket—

A pair of long rubber gaskets 27 each extending in an approximately U shape in cross section is attached to the ridge-side end of each solar cell panel 11, and is disposed with an interval in the beam direction. The gaskets 27 serving as a ridge-side holding member includes a long plate-shaped coupling wall 27*a* and a pair of long plate-shaped opposing walls 27*b* projecting on both edges of the coupling wall 27*a* extending in the longitudinal direction. A pair of ribs 27*c* extending in the longitudinal direction of the coupling wall 27*a* projects with an interval on the face of the coupling wall 27*a* on which the opposing walls 27*b* project.

Figure 10:
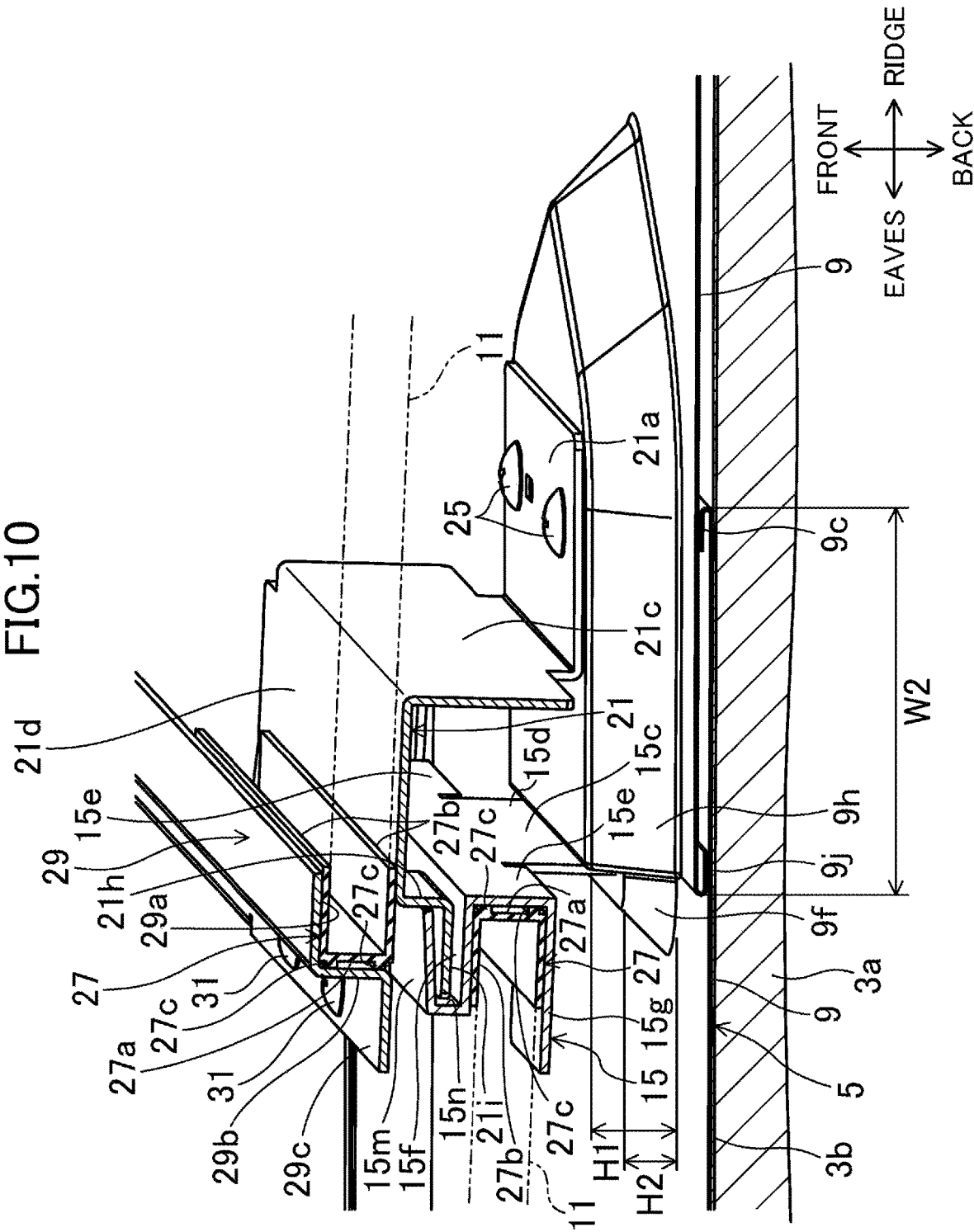
FIG. 10 is a cross-sectional view taken along line X-X in in FIG. 1B.

As illustrated in FIG. 10, the opposing walls 27*b* of the gaskets 27 hold the ridge-side end of the solar cell panel 11 at both sides in the thickness direction. The first holding wall 15*f* and the second holding wall 15*g* of the ridge-side frame member 15 hold the gaskets 27 and the ridge-side end of the solar cell panel 11. Accordingly, the second holding wall 15*g* of the ridge-side frame member 15 is in contact with the gaskets 27 at the back side of the solar cell panel 11. On the other hand, the rib portion 15*h* (see, for example, see FIG. 7) of the ridge-side frame member 15 projects relative to the second holding wall 15*g* toward the front direction of the solar cell panel 11 and face the gaskets 27 at both outer sides in the beam direction, thereby restricting movement of the gaskets 27 in the beam direction. The elevation portion 15*c* of the ridge-side frame member 15 is in contact with the ribs 27*c* of the gaskets 27 from the ridge side. The grooves 15*n* of the ridge-side frame member 15 are located at the front side of the ridge-side end of the solar cell panel 11 to which the ridge-side frame member 15 is attached. In this manner, the pair of ridge-side frame members 15 attached to the common base plate 9 is attached to the ridge-side end of the solar cell panel 11 with the gaskets 27 interposed therebetween, and disposed with an interval in the beam direction.

On the other hand, in a manner similar to the ridge-side end, gaskets 27 as a pair of eaves-side holding members are attached to the eaves-side end of the solar cell panel 11 and are disposed with an interval. The base portion of the center wall 21f of the eaves-side frame member 21 is in contact with the gaskets 27 at the back side of the solar cell panel 11. Accordingly, the projecting strip 21i of the eaves-side frame member 21 is located at the back side of the eaves-side end of the solar cell panel 11 to which the eaves-side frame member 21 is attached. The projecting walls 21e of the eaves-side frame member 21 project relative to the center wall 21f toward the front side of the solar cell panel 11 at both outer sides of the center wall 21f in the beam direction, and face the gasket 27 at both outer sides in the beam direction, thereby restricting movement of the gaskets 27 in the beam direction.

In addition, on the opposing walls 27b of the gaskets 27 attached to the eaves-side end of each solar cell panel 11 toward the front side of the solar cell panel 11, a long cover member 29 is attached to cover the eaves-side end of the solar cell panel 11 over the entire length thereof. The cover member 29 includes a long plate-shaped first face 29a facing the front side of the eaves-side end of the solar cell panel 11 and covers the eaves-side end over the entire length thereof, a long plate-shaped second face 29b extending from the eaves-side edge of the first face 29a toward the back side and covering the eaves-side end face of the solar cell panel 11 over the entire length thereof, and a long plate-shaped third face 29c extending from the back side edge of the second face 29b toward the eaves side. A region of the third face 29c to which the gaskets 27 are attached has a pair of cover-side through holes 29d (see FIG. 3) disposed with an interval in the longitudinal direction. A long plate-shaped fourth face 29e extending to the back side of the solar cell panel 11 is formed on the eaves-side edge of a portion of the third face 29c except a region to which the gaskets 27 are attached.

The cover member 29 configured as described above is fastened to the eaves-side frame member 21 by sequentially inserting screws 31 into the cover-side through holes 29d of the third face 29c of the cover member 29, and the frame-side through holes 21g of the eaves-side frame member 21 from the front side of the solar cell panel 11. In this manner, the pair of eaves-side frame members 21 attached to the common base plate 9 is attached to the eaves-side end of the solar cell panel 11 with the gaskets 27 interposed therebetween, and is disposed with an interval in the beam direction.

—Terminal Box, Cable, Cable Hook—

As illustrated in FIG. 2, a terminal box 33 is disposed at a position on the front face of the base plate 9 closer to the eaves side than the cushioning member 13 and sandwiched by the cushioning member 13 in the beam direction. The terminal box 33 houses base portions of a pair of cables 35, and a connector 37 is connected to a front end of each of the cables 35. The connector 37 is used for connection to a connector 37 of an adjacent building material-integrated solar cell module 5 and connection to a connector (not shown) of a cable drawn from a power conditioner (not shown).

Each of the cables 35 is held by the cable hook 15k such that the connector 37 connected to the front end is disposed near the cable hook 15k. Specifically, one of the cables 35 (e.g., the right cable in FIG. 2) is held by placing a vicinity of the front end of the cable 35 in contact with the front side of the cable hook 15k such that the connector connected to the front end of the cable 35 is located at the ridge side of the ridge-side frame member 15. An intermediate portion of the other cable 35 in the longitudinal direction is held by the cable hook 15k at the left of the left ridge-side frame member 15.

<Roof Structure>

The building material-integrated solar cell modules 5a to 5f configured as described above are arranged and constructed such that the back sides of the base plates 9 are in contact with the front side of the roof substrate 3 (waterproof sheet 3b) and positions of the solar cell panels 11 adjacent to each other in the eaves-ridge direction are shifted by ½ in the beam direction. Specifically, a left half of the solar cell panel 11 of the building material-integrated solar cell module 5a is adjacent to the right half of the solar cell panel 11 of the solar cell module 5d from the eaves side, a right half of the solar cell panel 11 of the building material-integrated solar cell module Sb is adjacent to a left half of the solar cell panel 11 of the solar cell module 5d from the eaves side, and a left half of the solar cell panel 11 of the building material-integrated solar cell module Sb is adjacent to the right half of the solar cell panel 11 of the building material-integrated solar cell module Se from the eaves side. Similarly, a right half of the solar cell panel 11 of the building material-integrated solar cell module 5c is adjacent to a left half of the solar cell panel 11 of the building material-integrated solar cell module Se from the eaves side. A left half of the solar cell panel 11 of the building material-integrated solar cell module 5d is adjacent to a right half of the building material-integrated solar cell module 5f from the eaves side, and a right half of the solar cell panel 11 of the building material-integrated solar cell module Se is adjacent to a left half of the building material-integrated solar cell module 5f from the eaves side.

As illustrated in FIGS. 4A and 5, in two building material-integrated solar cell modules (5a and 5b, 5b and 5c, or 5d and Se) adjacent to each other in the beam direction, a left end (one end in the beam direction) of the base plate 9 of the right building material-integrated solar cell module 5a, 5b, or 5d overlaps with a right end (the other end in the beam direction) of the base plate of the left building material-integrated solar cell module 5b, 5c, or Se from the front side.

From the viewpoint of setting an overlapping width W1 of the base plates of the building material-integrated solar cell modules (5a and 5b, 5b and 5c, or 5d and 5e) adjacent to each other in the beam direction wider than the amount of entering of water due to capillary action, the width W1 is preferably 50 mm or more. Accordingly, even when water enters from the boundary between the base plates 9 adjacent to each other, this water does not reach the left end of the right base plate 9.

Ridge-side attachment holes 9e at the right ends of the base plates 9 of the left building material-integrated solar cell modules 5b, 5c, and 5e overlap with the ridge-side attachment holes 9e at the left end of the base plates 9 of the right building material-integrated solar cell modules 5a, 5b, and 5d from the front side. With washers (not shown) facing the front sides of the ridge-side attachment holes 9e at the right end of the base plates 9 of the left building material-integrated solar cell modules 5b, 5c, and 5e, fixing screws (not shown) are sequentially inserted in and fastened to the ridge-side attachment holes 9e at the right ends of the base plates 9 of the left building material-integrated solar cell modules 5b, 5c, and 5e, and the ridge-side attachment holes 9e at the left ends of the base plates 9 of the right building material-integrated solar cell modules 5a, 5b, and 5d from the front side. Accordingly, the building material-integrated solar cell modules 5*a* to 5*e* arranged side by side in the beam direction are grounded. The surfaces of the washers (not shown) used here and facing the base plates 9 are jagged uneven surfaces. Thus, while the fixing screws (not shown) are being fastened, plating on the surfaces of the base plates 9 are removed by contact with the uneven surfaces of the washers (not shown), and the fixing screws are conducted to the base plates 9 through the washers. The base plates 9 of the building material-integrated solar cell modules 5*a* to 5*f* adjacent to one another in the eaves-ridge direction are conducted through the ridge-side frame member 15 and the eaves-side frame member 21. Thus, the building material-integrated solar cell module 5*f* not adjacent to the other building material-integrated solar cell modules 5 in the eaves-ridge direction is also grounded.

As illustrated in FIGS. 4B and 10, in two of the building material-integrated solar cell modules 5*a* to 5*f* adjacent to each other in the eaves-ridge direction, the eaves-side ends of the base plates 9 of the ridge-side building material-integrated solar cell module 5*d* to 5*f* overlap with the ridge-side ends of the base plates 9 of the eaves-side building material-integrated solar cell modules 5*a* to 5*e* from the front side. From the viewpoint of setting an overlapping width W2 (see FIG. 10) of the base plates 9 of the building material-integrated solar cell modules 5*a* to 5*f* adjacent to each other wider than the amount of entering of water due to capillary action, the width W2 is preferably 50 mm or more. Accordingly, even when water enters from the boundary between the base plates 9 adjacent to each other in the eaves-ridge direction, this water does not enter the right end of the eaves-side base plate 9. In two of the building material-integrated solar cell modules 5*a* to 5*f* adjacent to each other in the eaves-ridge direction, the eaves-side bulges 9*h* of the base plates 9 of the ridge-side building material-integrated solar cell modules 5*d* to 5*f* overlap the ridge-side bulges 9*f* of the base plates 9 of the eaves-side building material-integrated solar cell modules 5*a* to 5*e* from the front side of the base plates 9.

Then, as illustrated in FIG. 10, in two solar cell panels 11 adjacent to each other in the eaves-ridge direction, the projecting strips 21*i* of the eaves-side frame member 21 attached to a portion of the ridge-side solar cell panel 11 adjacent to the eaves-side solar cell panel 11 are inserted in and engaged with the grooves 15*n* of the ridge-side frame member 15 attached to a portion of the eaves-side solar cell panel 11 adjacent to the ridge-side solar cell panel 11. Thus, the projecting strips 21*i* of the left eaves-side frame member (first engaged member) 21 of the solar cell panel (second solar cell panel) 11 of the building material-integrated solar cell module 5*d* are inserted in and engaged with the grooves 15*n* of the right ridge-side frame member (first engaging member) 15 of the solar cell panel (first solar cell panel) 11 of the building material-integrated solar cell module 5*b* adjacent to the eaves sides of the solar cell panels (second and third solar cell panels) 11 of the building material-integrated solar cell modules 5*d* and 5*e*. The projecting strips 21*i* of the right eaves-side frame member (second engaged member) 21 of the solar cell panel 11 of the building material-integrated solar cell module 5*e* (third solar cell panel) are inserted in and engaged with the grooves 15*n* of the left ridge-side frame member (second engaging member) 15 of the solar cell panel 11 of the building material-integrated solar cell module 5*b*.

Figure 11:
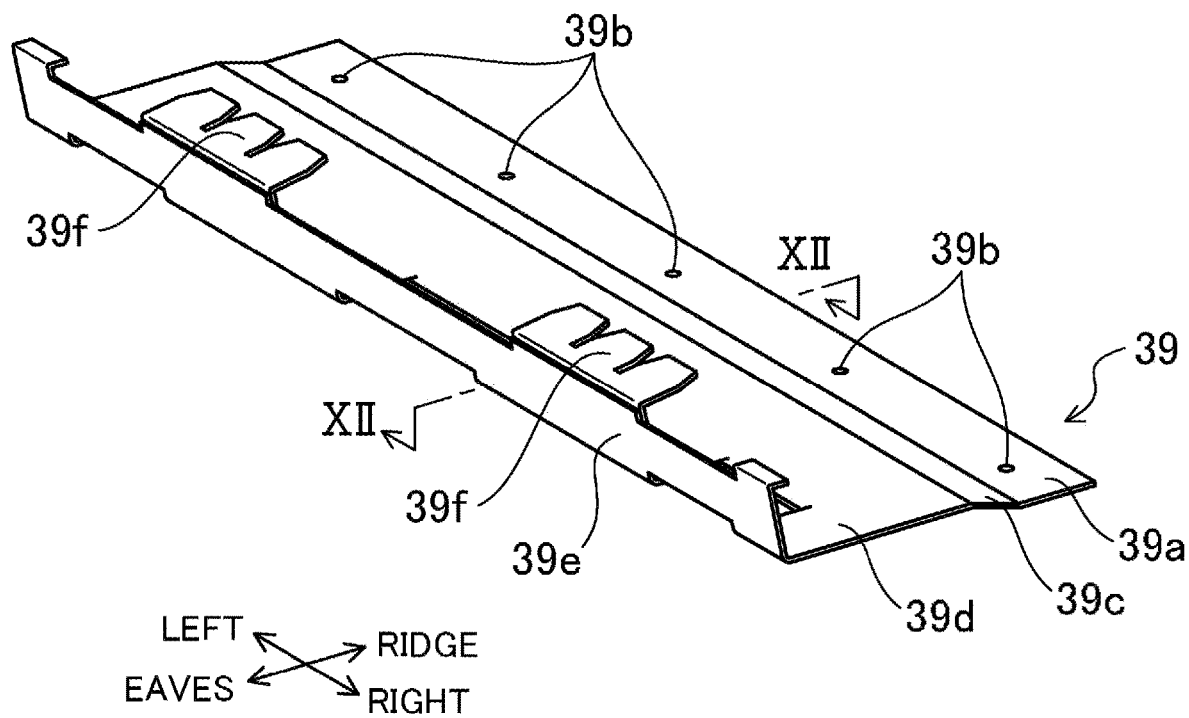
FIG. 11 is a perspective view of an eaves-side member.
Figure 12:
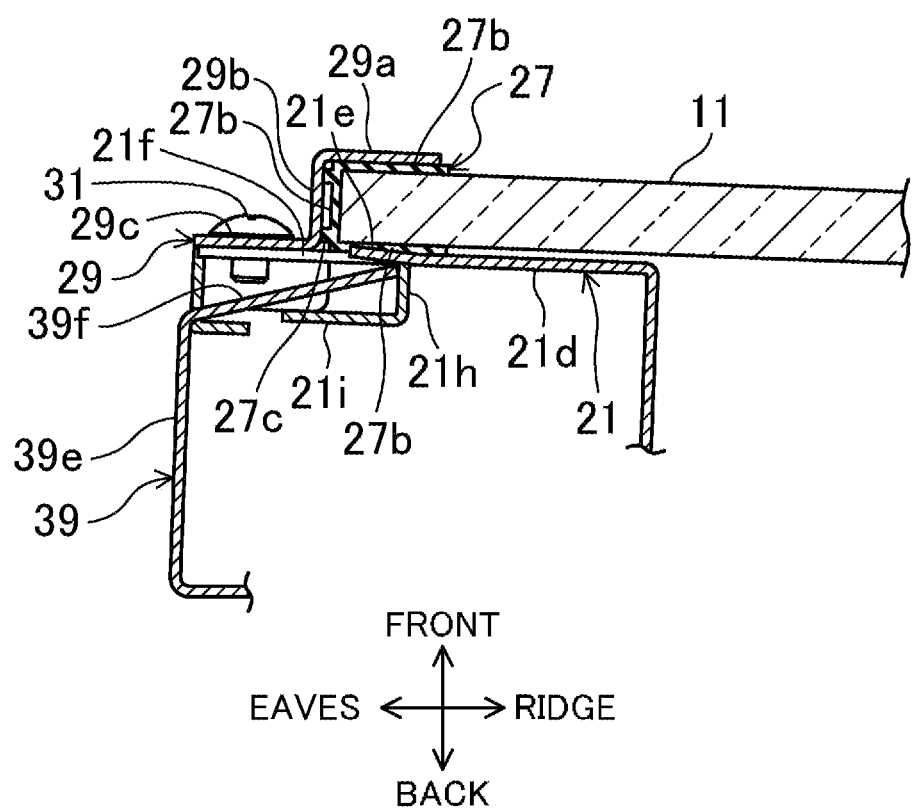
FIG. 12 is a cross-sectional view taken along line XII-XII in FIG. 11.

An eaves-side member 39 illustrated in FIGS. 11 and 12 is attached to each of the eaves-side frame members 21 of the building material-integrated solar cell modules 5*a* to 5*c* to which no building material-integrated solar cell modules 5 are adjacent to the eaves side thereof. The eaves-side member 39 includes a long plate-shaped attachment plate portion 39*a* having one face in contact with the roof sub 3 (waterproof sheet 3*b*) and extending in the beam direction. The attachment plate portion 39*a* has five eaves-side attachment holes 39*b* arranged with intervals in the beam direction. Screws (not shown) are inserted in and fasten to the eaves-side attachment holes 39*b* and the roof substrate 3 so that the eaves-side member 39 is thereby fixed to the roof substrate 3. At the eaves-side edge of the attachment plate portion 39*a* extending in the longitudinal direction, a tilt plate portion 39*c* tilting to the front side of the roof substrate 3 toward the eaves side extends to the same direction as the attachment plate portion 39*a* in the beam direction. At an expansion end of the tilt plate portion 39*c*, an expansion plate portion 39*d* extending substantially in parallel with the attachment plate portion 39*a* extends to the same direction as the attachment plate portion 39*a* in the beam direction. On the expansion end of the expansion plate portion 39*d*, an upright plate portion 39*e* stands toward the front side. On the front end of the upright plate portion 39*e*, a pair of plate-shaped insertion portions 39*f* having plate faces oriented in front-back direction projects toward the ridge side and is disposed with an interval in the beam direction. The insertion portions 39*f* of the building material-integrated solar cell modules 5*a* to 5*c* face the projecting strip 21*i* of the eaves-side frame member 21 from the front side to restrict movement of the eaves-side frame member 21 to the front side, and also face the center wall 21*f* of the eaves-side frame member 21 from the back side to restrict movement of the eaves-side frame member 21 to the back side. This can prevent the eaves-side frame member 21 from wobbling in the front-back direction.

Figure 13:
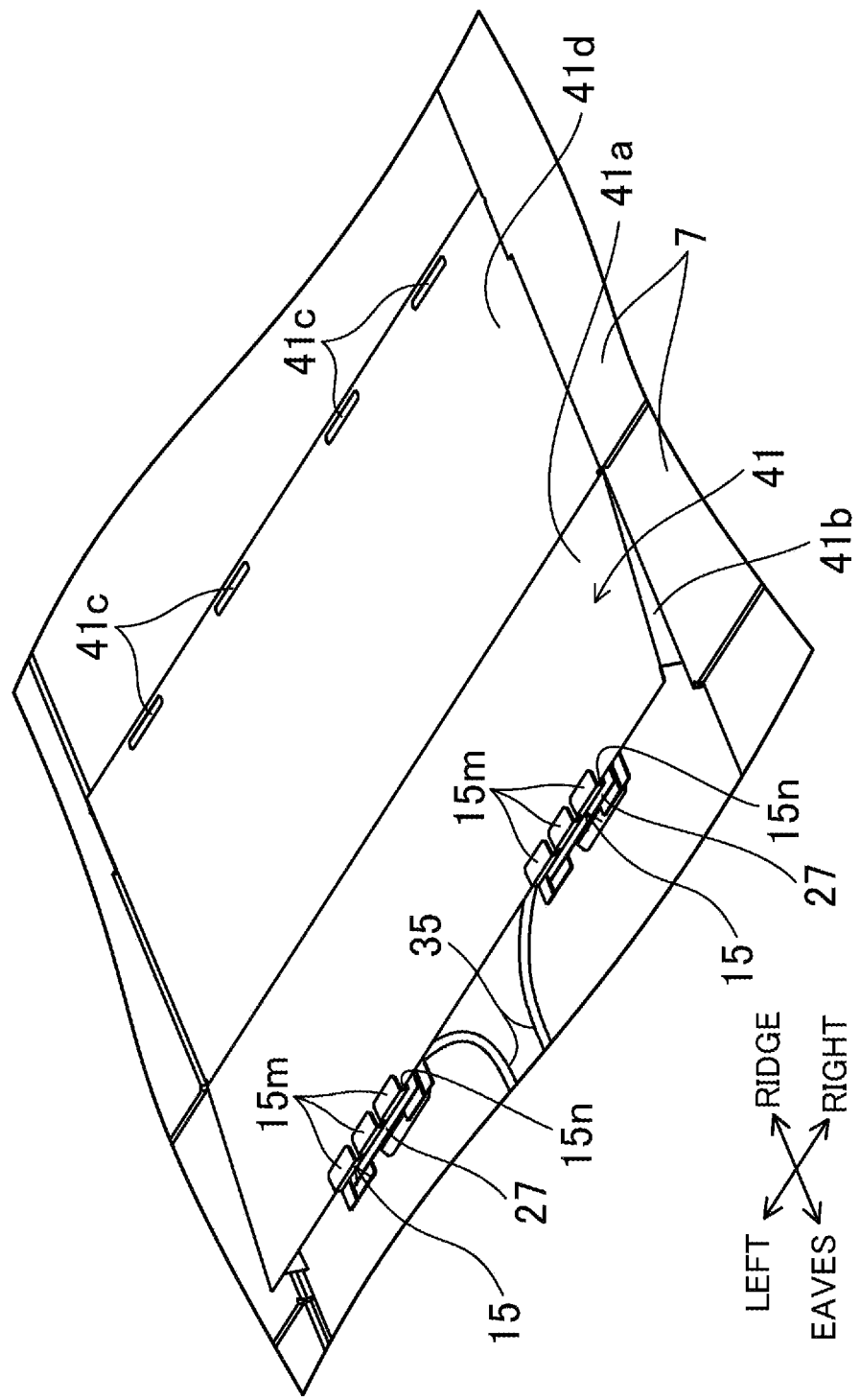
FIG. 13 is a perspective view of a first ridge-side cover and a vicinity thereof.

A first ridge-side cover 41 is provided at the ridge side of the solar cell panel 11 to which no solar cell panel 11 is adjacent at the ridge side, that is, the ridge side of the building material-integrated solar cell panel 11 of the solar cell module 5*f*. The first ridge-side cover 41 includes a plate-shaped first principal face 41*a*, and a first ridge-side plate portion 41*d* located at the ridge side of the first principal face 41*a*. The first principal face 41*a* covers the front side of the roof substrate 3 (waterproof sheet 3*b*) at the ridge side of the solar cell module 5*f*. The front side of the first ridge-side plate portion 41*d* is covered with the slate 7 disposed at the ridge side of the first ridge-side cover 41 (see FIG. 1A). FIG. 13 does not show the slate 7 covering the first ridge-side plate portion 41*d* of the first ridge-side cover 41. First side faces 41*b* project to the back side on both edges of the first principal face 41*a* in the beam direction. The first ridge-side plate portion 41*d* of the first ridge-side cover 41 have four screw holes 41*c* arranged with intervals in the beam direction. Screws (not shown) are inserted in and fastened to the screw holes 41*c* and the roof substrate 3 so that the first ridge-side plate portion 41*d* of the first ridge-side cover 41 and the slates 7 are thereby fixed to the roof substrate 3 (jointed). As also illustrated in FIG. 13, the eaves-side end of the first principal face 41*a* of the first ridge-side cover 41 is inserted in and engaged with the grooves 15*n* of the ridge-side frame members 15 of the building material-integrated solar cell module 5*f*.

A second ridge-side cover 43 is provided at the ridge side of a portion of the solar cell panel 11 (the building material-integrated solar cell panel 11 of each of the solar cell modules 5*a*, 5*c*, 5*d*, and 5*e*) having a half in the beam direction adjacent to the eaves sides of the slates 7. The second ridge-side cover 43 includes a plate-shaped second principal face 43*a* and a second ridge-side plate portion 43*d* located at the ridge side of the plate-shaped second principal face 43a. The second principal face 43a covers the front side of the roof substrate 3 (waterproof sheet 3b) at the ridge side of the building material-integrated solar cell module 5 (e.g., the building material-integrated solar cell modules 5a, 5c, 5d, and 5e) adjacent to the eaves side of the second principal face 43a. The front side of the second ridge-side plate portion 43d is covered with the slate 7 at the ridge side of the second ridge-side cover 43 (see FIG. 1A). The second side face 43b projects toward the back side on both edges of the second principal face 43a in the beam direction. The second ridge-side plate portion 43d of the second ridge-side cover 43 has two screw holes 43c disposed with an interval in the beam direction. Screws (not shown) are inserted in and fastened to the screw holes 43c and the roof substrate 3 so that the second ridge-side plate portion 43d of the second ridge-side cover 43 and the slates 7 are thereby fixed to the roof substrate 3 (jointed). On the other hand, the eaves-side end of the second principal face 43a of the second ridge-side cover 43 is inserted in the groove 15n of the ridge-side frame member 15 attached to a portion of each of the building material-integrated solar cell modules 5a, 5c, 5d, and 5e adjacent to the slates of the solar cell panel 11.

As illustrated in FIG. 1B, at the boundary between the base plate 9 of each of the solar cell modules 5a and 5c through 5f and the slate 7 adjacent to the base plate 9 in the beam direction, a long draining plate 45 is provided to extend over the entire length of the boundary and expand toward the ridge side relative to the ridge-side edge of the base plate 9.

A left side portion of each draining plate 45 at the right of the base plate 9 of the building material-integrated solar cell module 5a, 5d, or 5f is located at the back side of the base plate 9 and at the front side of the waterproof sheet 3b. On the other hand, a right portion of each draining plate 45 at the right of the base plate 9 is located at the back side of the slate 7 and at the front side of the waterproof sheet 3b.

A right portion of each draining plate 45 at the left of the base plate 9 of the building material-integrated solar cell module 5c, 5e, or 5f is located at the front side of the base plate 9 and at the back side of the solar cell panel 11. On the other hand, a left portion of each draining plate 45 at the left of the base plate 9 is located at the front side of the base plate 9 and at the back side of the slate 7. A region overlapping with the first ridge-side cover 41 or the second ridge-side cover 43 of the draining plate 45 is located at the back side of the first ridge-side cover 41 or the second ridge-side cover 43 and at the front side of the waterproof sheet 3b.

The roof surfaces 1 configured as described above can be built by constructing the building material-integrated solar cell modules 5a to 5f with the entire front face of the roof substrate 3 covered with the waterproof sheet 3b, then constructing the right draining plates 45 of the building material-integrated solar cell modules 5a, 5d, and 5f with left portions of the right draining plates 45 held between the base plate 9 of the building material-integrated solar cell modules 5a, 5d, and 5f and the waterproof sheet 3b, constructing the left draining plates 45 of the building material-integrated solar cell modules 5c, 5e, and 5f with right portions of the left draining plates 45 located at the front side of the base plates 9 of the building material-integrated solar cell modules 5c, 5e, and 5f, and lastly constructing the slates 7.

Thus, in the first embodiment, one of the two solar cell panels 11 can be positioned while being displaced from the other solar cell panel 11 to the beam direction (to the left) by ½ only by fitting and engaging the projecting strips 21i of the left eaves-side frame member 21 of the other solar cell panel 11 in/with the grooves 15n of the right ridge-side frame member 15 of the one solar cell panel 11. In addition, one of the two solar cell panels 11 can be positioned while being displaced from the other solar cell panel 11 to the beam direction (to the right) by ½ only by inserting and engaging the projecting strips 21i of the right eaves-side frame member 21 of the other solar cell panel 11 in/with the grooves 15n of the left ridge-side frame member 15 of one solar cell panel 11. Accordingly, positioning of solar cell panels 11 in the beam direction can be easily performed.

Relative positions of the projecting strips 21i of the right eaves-side frame member 21 and the grooves 15n of the right ridge-side frame member 15 relative to the solar cell panel 11 in the beam direction are identical, and relative positions of the projecting strips 21i of the left eaves-side frame member 21 and the grooves 15n of the left ridge-side frame member 15 relative to the solar cell panel 11 in the beam direction are identical. Thus, when in/with the grooves 15n of the right ridge-side frame member 15 of one of the two solar cell panels 11, the projecting strip 21i of the right eaves-side frame member 21 of the other solar cell panel 11 are inserted, the one solar cell panel 11 is positioned relative to the other solar cell panel 11 without any displacement in the beam direction. Accordingly, the plurality of building material-integrated solar cell modules 5 are applicable to a case where solar cell panels 11 are placed on a roof surface without displacement, in the beam direction, of solar cell panels 11 adjacent to each other in the eaves-ridge direction. Consequently, the building material-integrated solar cell modules 5 have high versatility.

Since the grooves 15n extend in the beam direction in the engaging portion of the ridge-side frame member 15 and the projecting strip 21i extending in the beam direction on the engaged portion of the on eaves-side frame member 21, rising of the eaves-side frame member 21 caused by wind or the like can be prevented without fail as compared to a case where the engaging portion and the engaged portion are extremely short in the beam direction.

After the eaves-side building material-integrated solar cell modules 5a to 5e in a pair of building material-integrated solar cell modules 5a to 5f adjacent to one another in the eaves-ridge direction have been placed on the roof surface, the ridge-side building material-integrated solar cell module 5d to 5f are caused to slide from the ridge-side to the eaves direction. Only by this sliding, the projecting strips 21i of the eaves-side frame member 21 of the ridge-side building material-integrated solar cell module 5d to 5f are allowed to be inserted in the grooves 15n of the ridge-side frame member 15 of the eaves-side solar cell panel 11. Since the ridge-side building material-integrated solar cell modules 5d to 5f do not need to slide in the ridge direction, installation work is easy.

Second Embodiment

Figure 14:
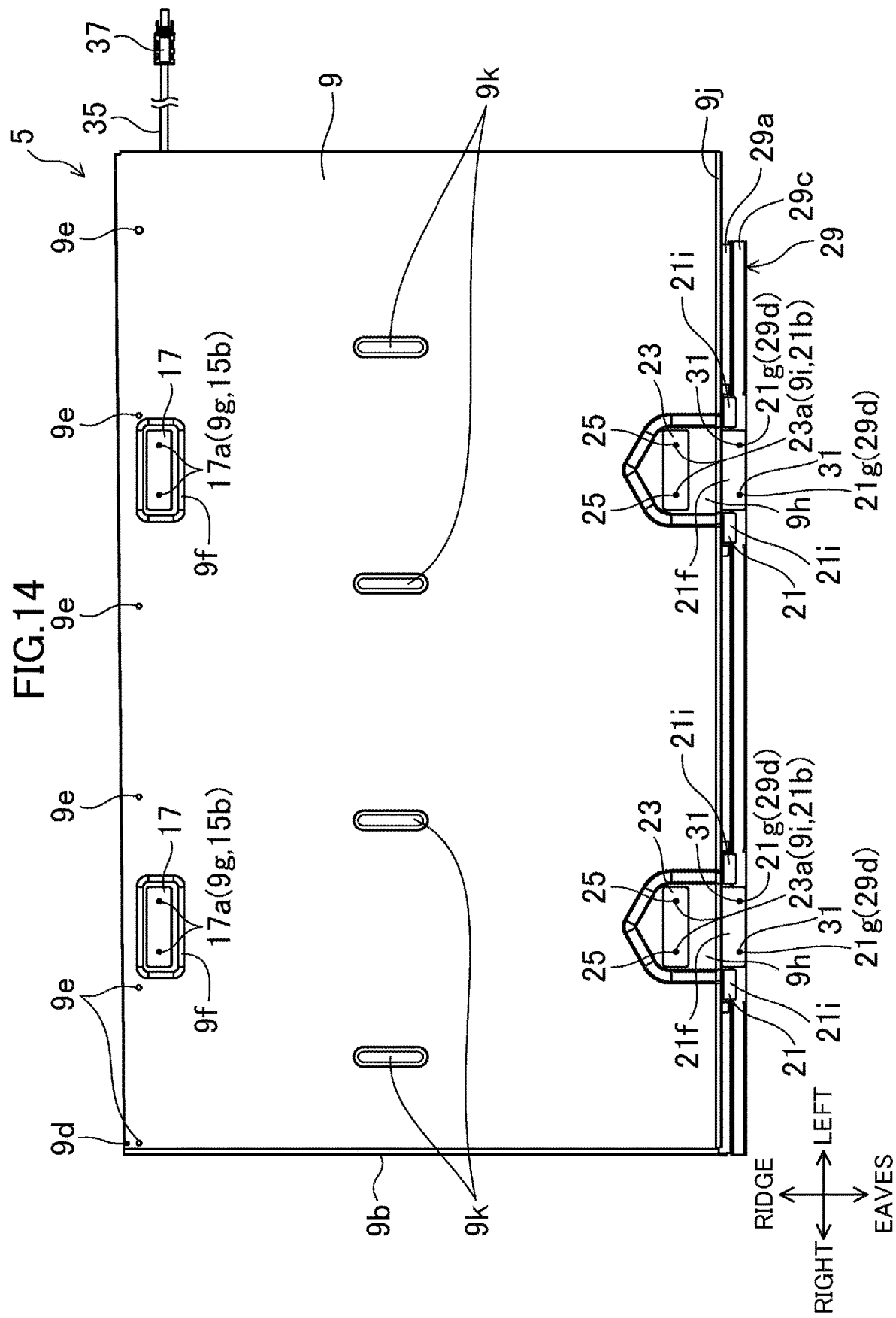
FIG. 14 is a view for a second embodiment corresponding to FIG. 3.

FIG. 14 is a view for a second embodiment corresponding to FIG. 3. In the second embodiment, on an intermediate portion of each base plate 9 in the eaves-ridge direction, four reinforcing bulges 9k elongated in the eaves-ridge direction and bulging to the back side are arranged with intervals in the beam direction.

Figure 15:
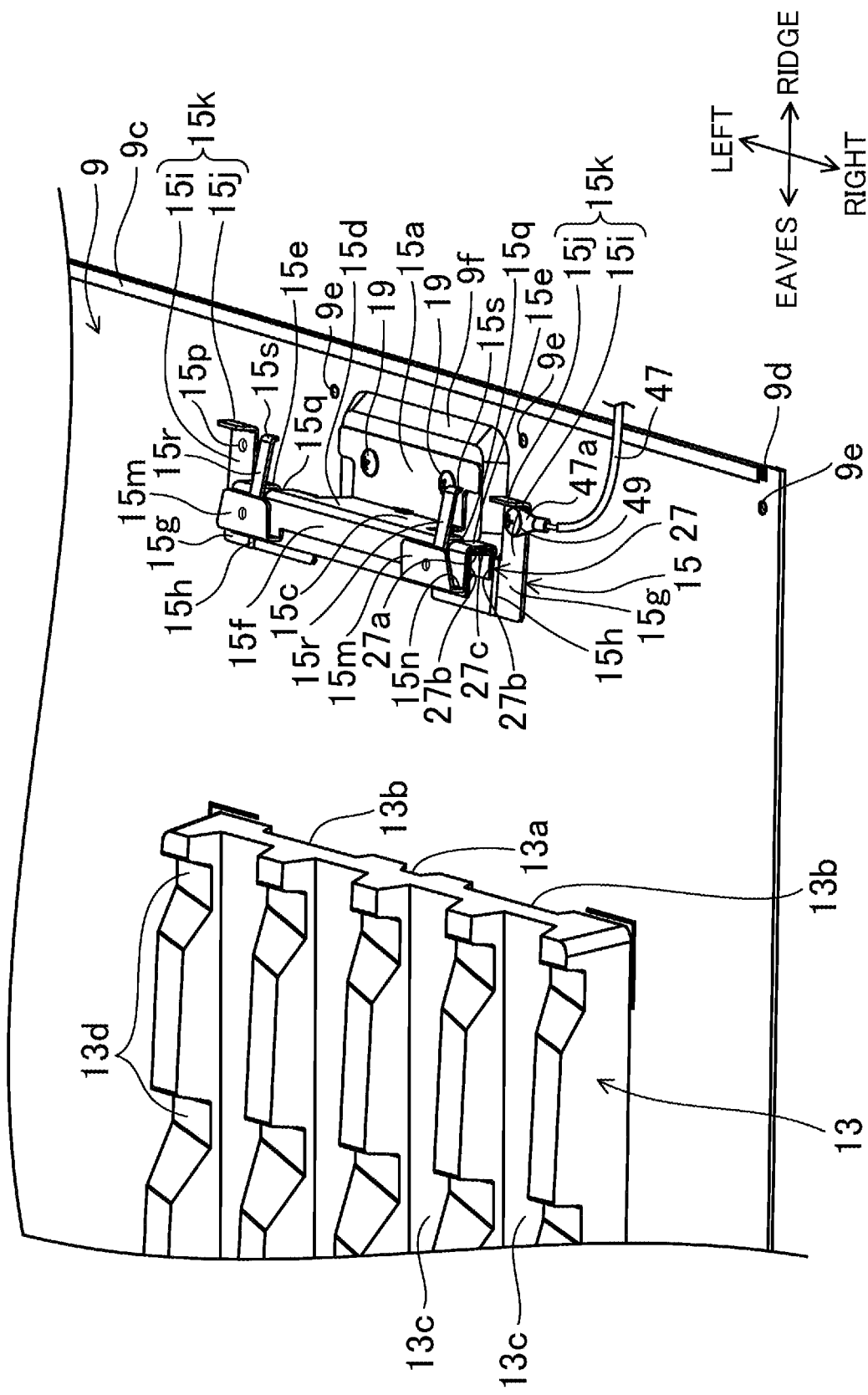
FIG. 15 is a view for the second embodiment corresponding to FIG. 7.

As illustrated in FIG. 15, a ground hole 15p as a circular connection portion is formed to penetrate a front end portion of each expansion wall 15i of the ridge-side frame member 15. One bent wall 15m of the ridge-side frame member 15 projects on each end portion, in the beam direction, of the front edge of the first holding wall 15*f*. In portions of the first holding wall 15*f* of the ridge-side frame member 15, the expansion portion 15*e* of the elevation portion 15*c*, and the second holding wall 15*g* slightly away from both ends in the beam direction, notches 15*q* are continuously formed over the entire length of the first holding wall 15*f* in the projecting direction (eaves-ridge direction), the entire length of the expansion portions 15*e* in the thickness direction of the base plate 9, and a base portion (ridge-side portion) of the second holding wall 15*g*. A slender protruding strip 15*r* protruding in the ridge direction is formed on the edge of each notch 15*q* toward the first holding wall 15*f*. A front bent portion 15*s* bent toward the base plate 9 is formed at the front end of the protruding strip 15*r*. The protruding strip 15*r* is formed by cutting out a portion corresponding to the notch 15*q* and bending this portion.

Circular hole terminals 47*a* attached to ends of ground wires 47 are fastened, with screws 49, to the ground holes 15*p* of the ridge-side frame members (first and second engaging members) 15 attached to two solar cell panels (first and second solar cell panels) 11 adjacent to each other in the eaves-ridge direction so that peripheries of the ground holes (first and second connection portions) 15*p* of the ridge-side frame members 15 attached to the solar cell panels 11 are connected to each other through the ground wires 47 and the solar cell panels 11 adjacent to each other in the eaves-ridge direction are electrically connected to each other.

Figure 16:
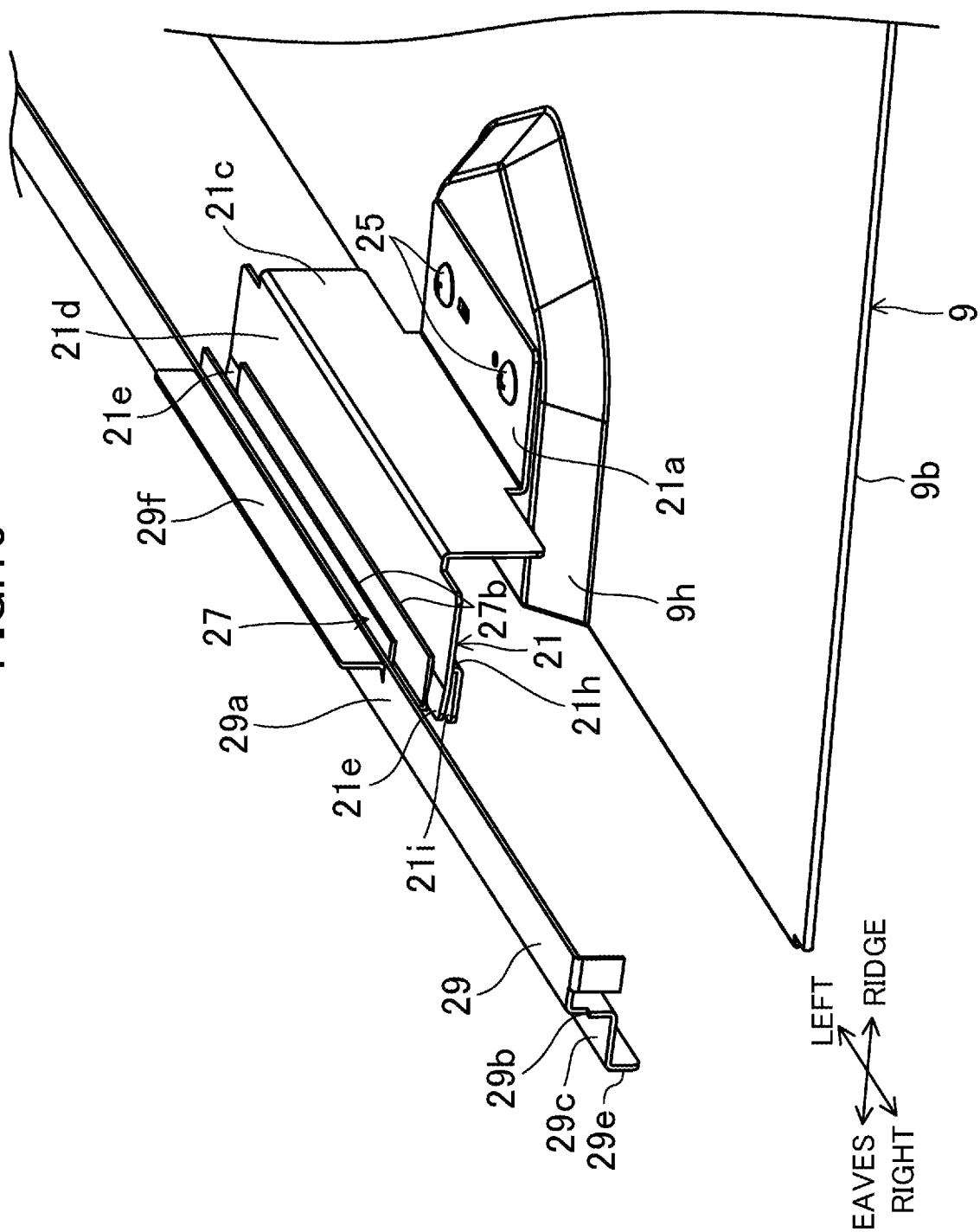
FIG. 16 is a view for the second embodiment corresponding to FIG. 8.

As illustrated in FIG. 16, a rectangular plate-shaped snow guard portion 29*f* extending in the beam direction with a plate face thereof oriented in the eaves-ridge direction integrally projects on a ridge-side end of a region of the first face 29*a* of the cover member 29 where the gasket 27 is attached.

Figure 17:
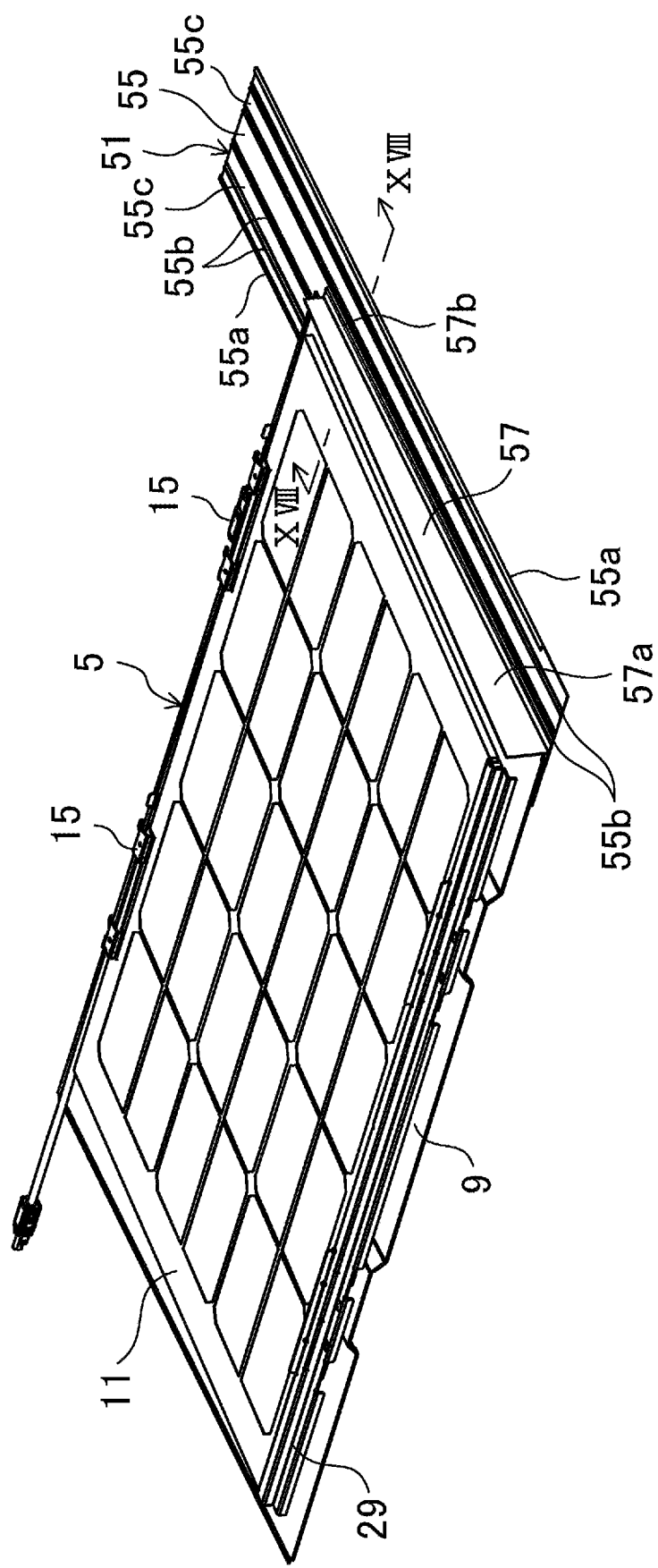
FIG. 17 is a perspective view of building material-integrated solar cell modules and a first draining member.
Figure 18:
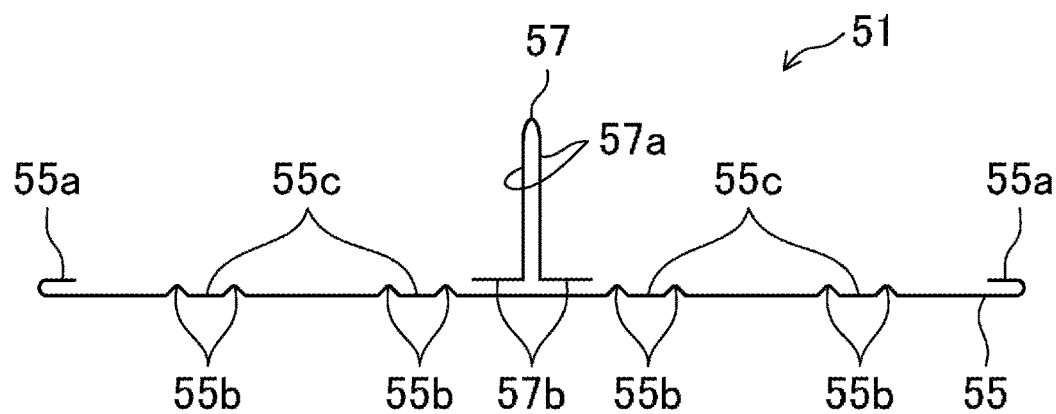
FIG. 18 is a cross-sectional view taken along line XVIII-XVIII in FIG. 17.
Figure 19:
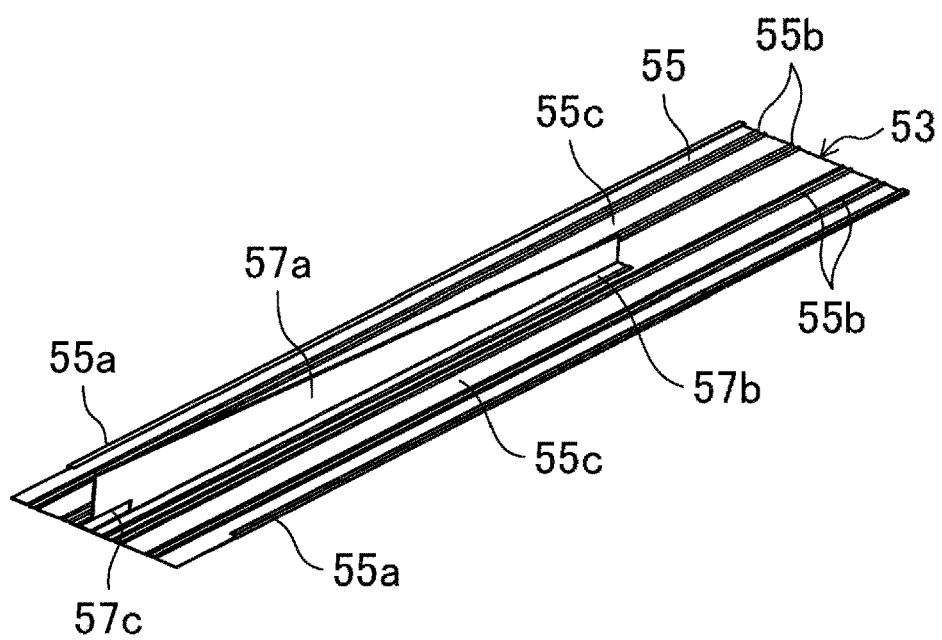
FIG. 19 is a perspective view of a second draining member.

Instead of the draining plate 45, a long first draining member 51 illustrated in FIGS. 17 and 18 is provided at the boundary between the base plates 9 of the building material-integrated solar cell modules 5*a* and 5*c* at the eaves-side end and the slates 7 adjacent to the base plates 9 in the beam direction. Instead of the draining plate 45, a long second draining member 53 illustrated in FIG. 19 is provided at the boundary between the base plates 9 of the building material-integrated solar cell modules 5*d* to 5*f* not located at the eaves-side end and the slates 7 adjacent to the base plates 9 in the beam direction.

Each of the draining members 51 and 53 includes an approximately long plate-shaped body member 55, and folded portions 55*a* each having a U shape in cross section and bent inward in the lateral direction at one side over the longitudinal direction except for the other end in the longitudinal direction is formed at both lateral sides of the body member 55. The body member 55 includes four pairs of curved portions 55*b* that project to the one side to form approximately V shapes in cross section, are arranged adjacent to one another with short intervals in the lateral direction, and are formed over the entire length in the longitudinal direction. Accordingly, two curved portions 55*b* constituting each pair and the body member 55 between these curved portions 55*b* constitute a groove 55*c* extending in the longitudinal direction. The body member 55 is formed by bending one plate.

A projecting member 57 is fixed to a laterally center portion of the body member 55 at the one side over the entire length except for a lateral end thereof. The projecting member 57 is formed by bending one plate. The projecting member 57 includes a pair of opposed trapezoidal plate portions 57*a* having the same trapezoidal shape whose width gradually increases from one end to the other end in the longitudinal direction in plan view. Ends of the trapezoidal plate portions 57*a* at one side in the lateral direction are coupled to each other, and jut-out plate portions 57*b* jutting out in directions away from each other are formed from ends of the trapezoidal plate portions 57*a* at the other side in the lateral direction. The jut-out plate portions 57*b* are fixed by swaging to a laterally center portion of the body member 55 at the one side over the entire length of the body member 55 except for one end thereof in the longitudinal direction, with narrower sides of the trapezoidal plate portions 57*a* facing toward one end in the longitudinal direction of the body member 55.

Notch recesses 57*c* are formed in base portions of the second draining member 53 at the wider sides of the trapezoidal plate portions 57*a*, and are recessed toward the narrower sides, whereas no notch recesses 57*c* are formed in the first draining member 51.

Portions of the body members 55 of the draining members 51 and 53 configured as described above except for portions at one end in the longitudinal direction (regions where no projecting members 57 are provided) extend across the boundaries between the base plates 9 of the building material-integrated solar cell modules 5*a* and 5*c* to 5*f* and the slates 7 adjacent to these base plates 9, with the plate faces thereof oriented along the front faces of the base plates 9 (front face of the roof substrate 3). The trapezoidal plate portions 57*a* of the draining members 51 and 53 project toward the front side at positions corresponding to the boundary between the base plates 9 and the slates 7. The front ends of the trapezoidal plate portions 57*a* tilt with respect to the surfaces of the base plate and are located close to the solar cell panel 1 so as to extend along the front and back faces of the solar cell panels 11.

In a manner similar to the first embodiment, in the second embodiment, left portions of the draining members 51 and 53 at the right of the base plates 9 of the building material-integrated solar cell modules 5*a*, 5*d*, and 5*f* are located at the back side of the base plates 9 and at the front side of the waterproof sheets 3*b*. On the other hand, right portions of the draining members 51 and 53 at the right of the base plates 9 are located at the back side of the slates 7 and at the front side of the waterproof sheet 3*b*.

Right portions of the draining members 51 and 53 at the left of the base plates 9 of the building material-integrated solar cell modules 5*c*, 5*e*, and 5*f* are located at the front side of the base plates 9 and at the back side of the solar cell panels 11. On the other hand, left portions of the draining members 51 and 53 at the left of the base plates 9 are located at the front side of the base plates 9 and at the back side of the slates 7. End portions of the body members 55 of the draining members 51 and 53 at one side in the longitudinal direction (regions where no projecting members 57 are provided) project toward the ridge side from the boundaries between the base plates 9 and the slates 7. Regions of the end portions of the body members 55 of the draining members 51 and 53 at the one end in the longitudinal direction overlapping with the first ridge-side cover 41 or the second ridge-side cover 43 are located at the back side of the first ridge-side cover 41 or the second ridge-side cover 43 and at the front side of the waterproof sheet 3*b*.

A ridge-side end of the solar cell panel 11 adjacent to the eaves side of the second draining member 53 is fitted in the notch recess 57*c* of each second draining member 53.

The other part of the configuration is the same as that in the first embodiment, and thus, the same components are denoted by the same reference characters, and description thereof will not be repeated.

Thus, in the second embodiment, since the base plates 9 include the reinforcing bulges 9k, deformation of the base plates 9 can be prevented or reduced.

In addition, since the ridge-side frame members 15 has the ground holes 15p, the number of parts can be reduced, as compared to a case where members for providing the ground holes 15p are provided separately from the ridge-side frame members 15.

The snow guard portions 29f are integrally formed on the cover members 29, and thus, the number of parts can be reduced, as compared to a case where members for forming snow guards provided separately from the snow guard portions 29f. This also eliminates necessity for attaching members for snow guards to the cover members 29 or the solar cell panels 11 so that construction can be thereby easily performed.

The draining members 51 and 53 have the trapezoidal plate portions 57a, and thus, entering of water, insects, and small animals to the back side of the solar cell panels 11 from the outside in the beam direction can be reduced.

The front ends of the trapezoidal plate portions 57a of the draining members 51 and 53 are formed not to project from the front faces of the solar cell panels 11, and thus, the trapezoidal plate portions 57a do not block sunlight.

Since the front ends of the trapezoidal plate portions 57a of the draining members 51 and 53 are close to the edges of the solar cell panels 11, entering of water, insects, and small animals from a space between the solar cell panels 11 and the trapezoidal plate portions 57a can be reduced.

In constructing the slates 7, the edges of the slates 7 in the beam direction are brought into contact with the trapezoidal plate portions 57a of the draining members 51 and 53 so that the slates 7 can be thereby positioned in the beam direction.

Since the draining members 51 and 53 are constituted by the body members 55 and the projecting members 57, plates to be subjected to a bending process are allowed to have small size and are easy to carry, and thus, the bending process can be easily performed, as compared to a case where the entire draining members 51 and 53 are constituted by one member. In addition, availability of a material in punching of components of the draining members 51 and 53 can be enhanced.

The side walls of the grooves 55c of the draining members 51 and 53, that is, the curved portions 55b, reduce spreading of water attached to the inner sides of the grooves 55c outward of the groove 55c, and thus, drainability can be enhanced.

In addition, the folded portions 55a of the draining members 51 and 53 reduce spreading of water attached to the laterally inner side than the folded portions 55a of the draining members 51 and 53 outward in the lateral direction, and thus, entering of water into the back side of the draining members 51 and 53 can be reduced.

First Variation of Second Embodiment

Figure 20:
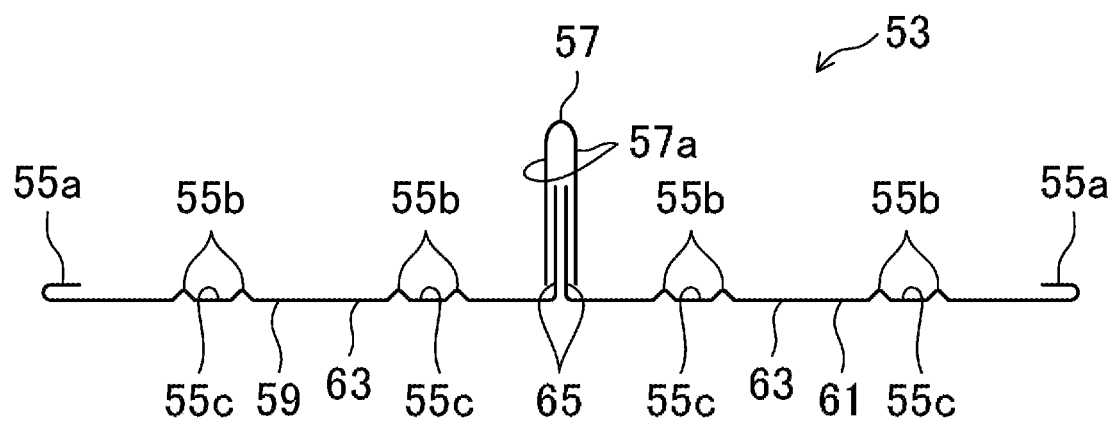
FIG. 20 is a view for a first variation of the second embodiment corresponding to FIG. 18.

FIG. 20 is a view for a first variation of the second embodiment corresponding to FIG. 18. In the first variation, instead of the body members 55, each of the draining members 51 and 53 includes a left draining component 59 and a right draining component 61 adjacent to the right of the left draining component 59. Each of the left draining component 59 and the right draining component 61 includes an approximately long plate-shaped main plate portion 63. Two pairs of the curved portions 55b are arranged with intervals in the lateral direction on an intermediate portion of each main plate portion 63. The folded portions 55a are formed at the left end of the main plate portion 63 of the left draining component 59 and at the right end of the main plate portion 63 of the right draining component 61. Protruding walls 65 protrude on the right edge of the left draining component 59 and the left edge of the right draining component 61 over the entire length in the longitudinal direction except for the ridge-side ends. The projecting member 57 includes no jut-out plate portions 57b, the left trapezoidal plate portions 57a are fixed to the protruding wall 65 of the left draining component 59 by swaging, and the right trapezoidal plate portion 57a is fixed to the protruding wall 65 of the right draining component 61 by swaging.

The other part of the configuration is the same as that in the second embodiment, and thus, the same components are denoted by the same reference characters, and description thereof will not be repeated.

Second Variation of Second Embodiment

Figure 21:
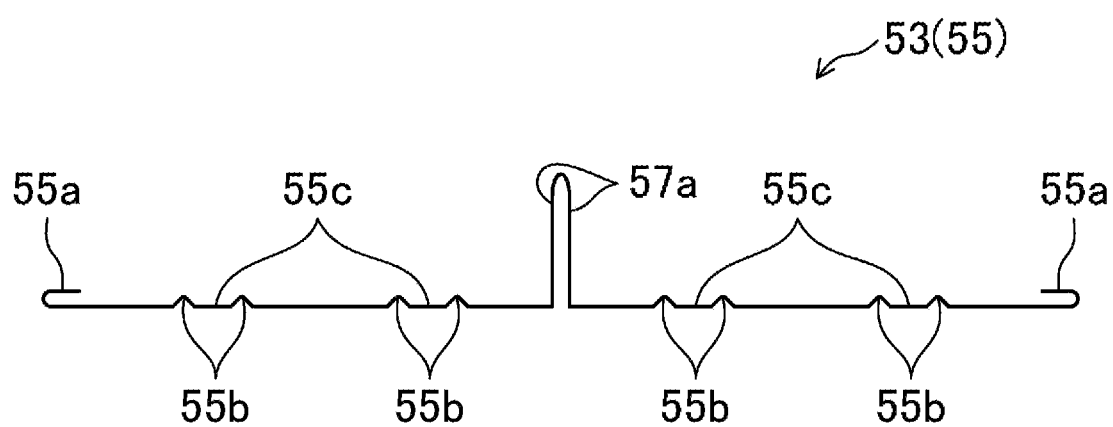
FIG. 21 is a view for a second variation of the second embodiment corresponding to FIG. 18.

FIG. 21 is a view for a second variation of the second embodiment corresponding to FIG. 18. In the second variation, each of the draining members 51 and 53 is constituted only by the body member 55. The trapezoidal plate portions 57a are formed by bending a laterally center portion of the body member 55.

The other part of the configuration is the same as that in the second embodiment, and thus, the same components are denoted by the same reference characters, and description thereof will not be repeated.

Third Embodiment

Figure 22:
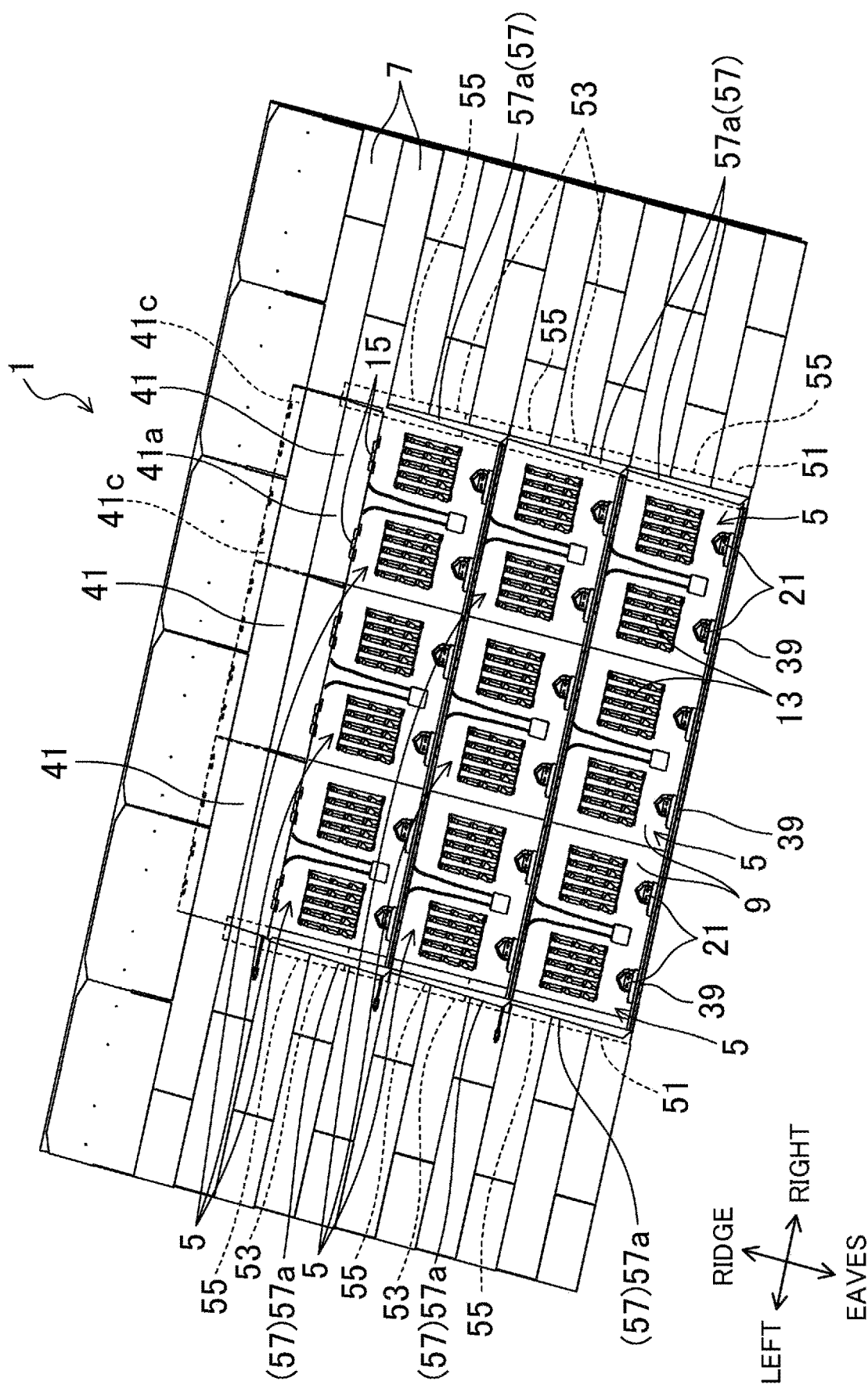
FIG. 22 is a view for a third embodiment corresponding to FIG. 1B.

FIG. 22 is a view for a third embodiment corresponding to FIG. 1B. In the third embodiment, building material-integrated solar cell modules 5 are arranged in three rows and three columns on a roof surface 1. In draining members 51 and 53 adjacent to each other in the eaves-ridge direction, an eaves-side end (a region where no folded portions 55a are formed) of the ridge-side draining member 53 overlaps with ridge-side ends (regions where no projecting member 57 are provided) of the body members 55 of the eaves-side draining members 51 and 53 from the front side. Movement of lateral ends of an eaves-side end portion of the ridge-side draining member 53 toward the front side is restricted by folded portions 55a at ridge-side ends of the body members 55 of the eaves-side draining members 51 and 53.

The other part of the configuration is the same as that in the second embodiment, and thus, the same components are denoted by the same reference characters, and description thereof will not be repeated.

Thus, in the third embodiment, in the draining members 51 and 53 adjacent to each other in the eaves-ridge direction, no folded portions 55a are formed at the eaves-side end of the ridge-side draining member 53, and thus, the eaves-side end of the ridge-side draining member 53 can be easily overlapped with the ridge-side end portions of the eaves-side draining members 51 and 53 from the front side, as compared to the case of forming folded portions 55a.

First Variation of Third Embodiment

Figure 23:
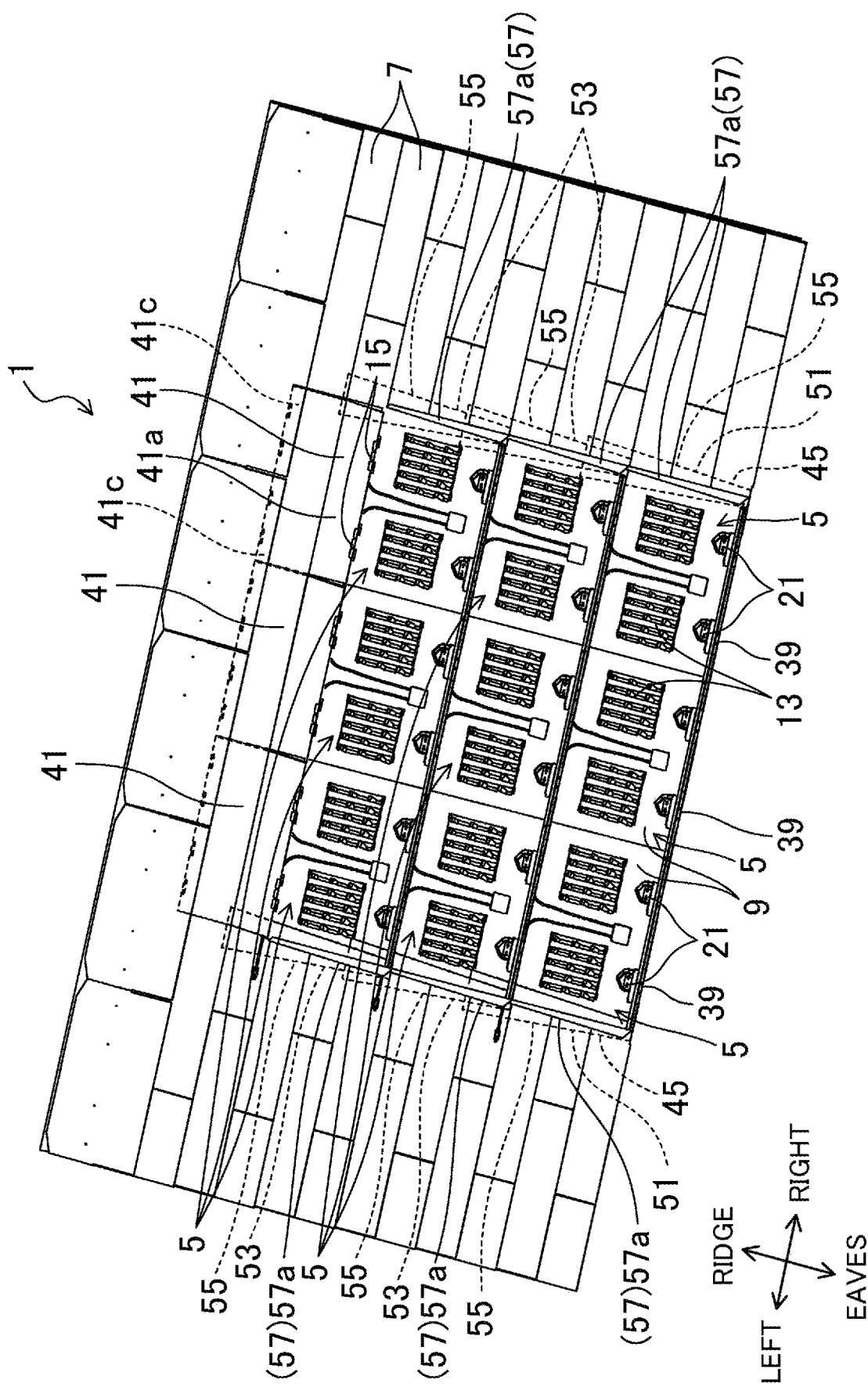
FIG. 23 is a view for a first variation of the third embodiment corresponding to FIG. 22.

FIG. 23 is a view for a first variation of the third embodiment corresponding to FIG. 22. In the first variation, the body member 55 has an isoscales trapezoidal plate shape whose width gradually increases toward the ridge side.

Folded portions 55a are formed on lateral ends of the body member 55 over the entire length in the longitudinal direction.

The other part of the configuration is the same as that in the third embodiment, and thus, the same components are denoted by the same reference characters, and description thereof will not be repeated.

As described above, in the first variation, in the draining members 51 and 53 adjacent to each other in the eaves-ridge direction, an eaves-side end portion of the ridge-side draining member 53 is narrower than ridge-side end portions of the body members 55 of the eaves-side draining members 51 and 53. Thus, the eaves-side end portion of the ridge-side draining member 53 can be easily overlapped with the ridge-side portions of the eaves-side draining members 51 and 53.

Second Variation of Third Embodiment

Figure 24:
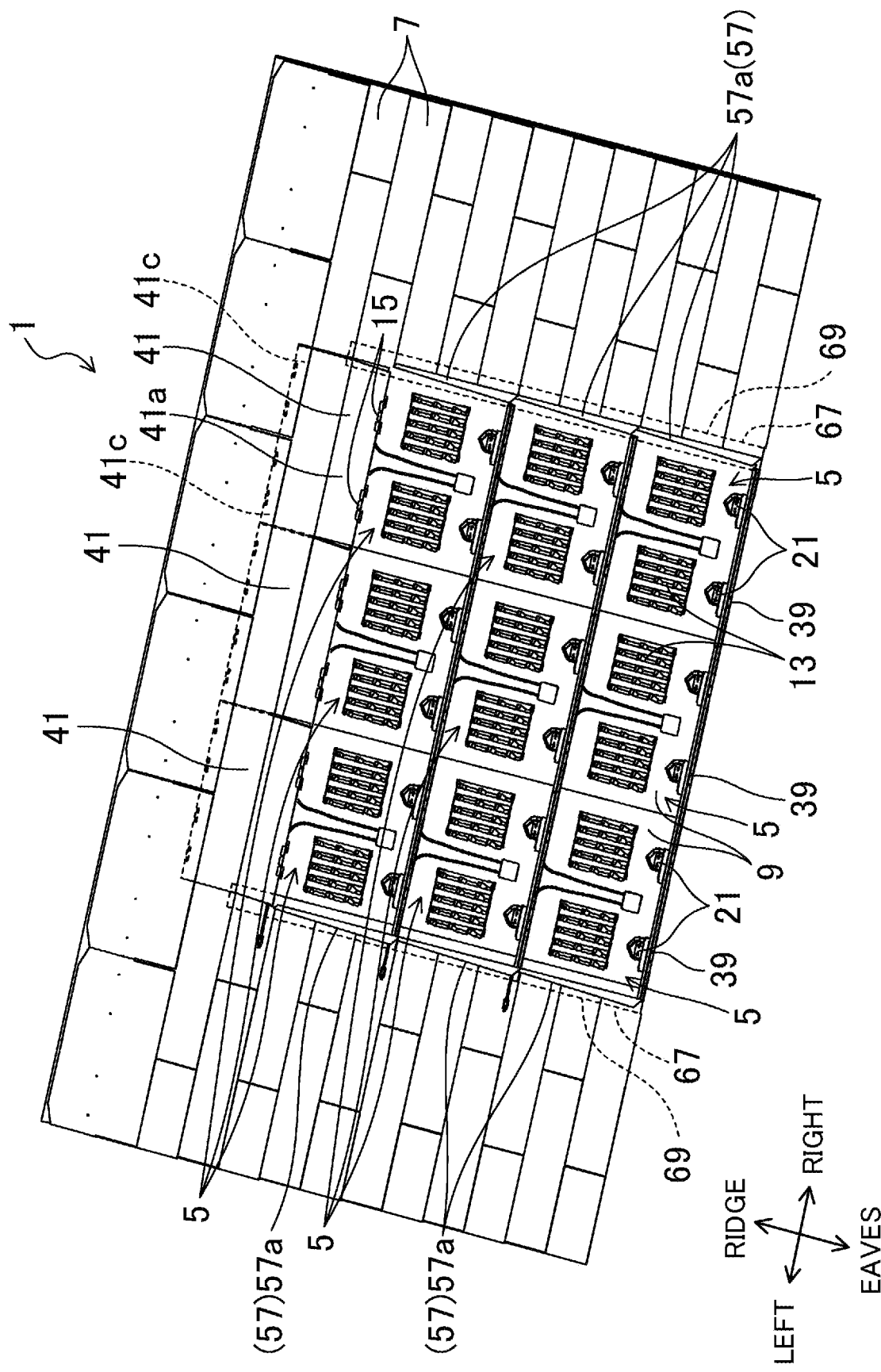
FIG. 24 is a view for a second variation of the third embodiment corresponding to FIG. 22.
Figure 25:
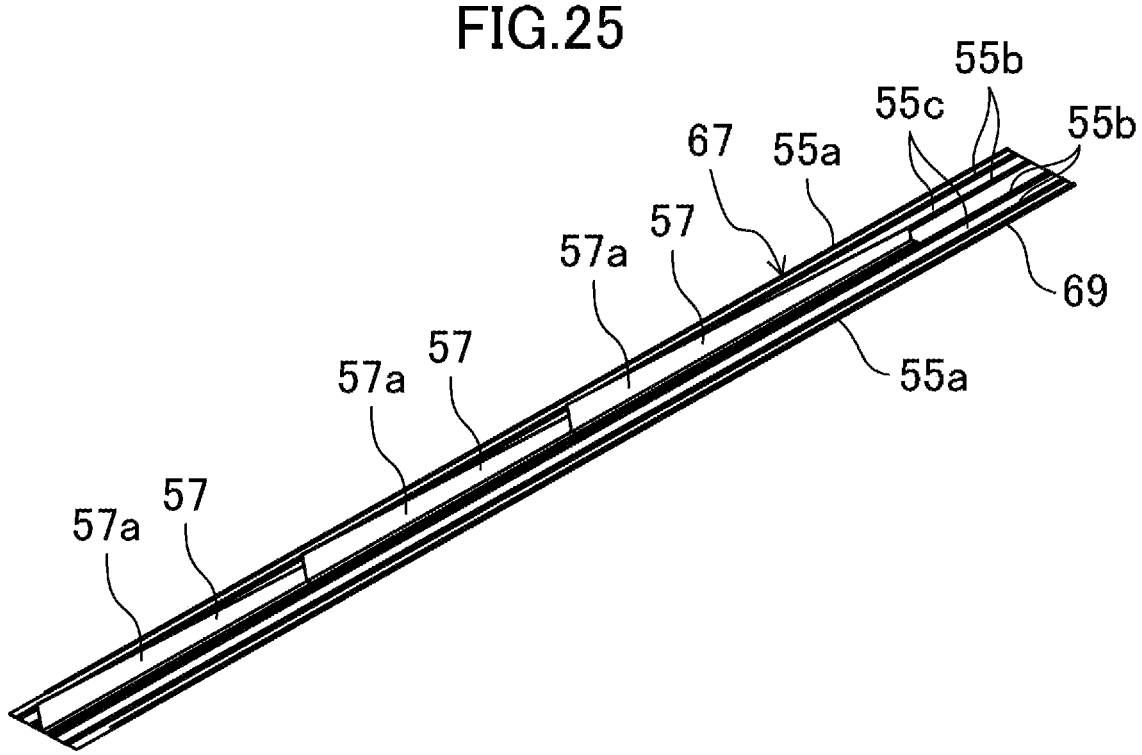
FIG. 25 is a perspective view of a draining member for three steps.

FIG. 24 is a view for a second variation of the third embodiment corresponding to FIG. 22. In the second variation, instead of the three draining members 51 and 53 arranged in the eaves-ridge direction, a long draining member 67 for three steps (three-step draining member) illustrated in FIG. 25 is disposed with the longitudinal direction thereof oriented in the eaves-ridge direction. The three-step draining member 67 includes an approximately long plate-shaped body member 69 whose plate face extending along the front face of the base plate 9 (front face of the roof substrate 3). On a laterally center portion of the body member 69 except for the ridge-side end thereof, three projecting members 57 are fixed with trapezoidal plate portions 57a thereof projecting toward the front side, and are arranged to be adjacent to one another in the eaves-ridge direction with the narrow sides of the trapezoidal plate portions 57a oriented toward the ridge side. On the body member 69, the folded portions 55a and the curved portions 55b are formed over the entire length in the longitudinal direction.

The other part of the configuration is the same as that in the third embodiment, and thus, the same components are denoted by the same reference characters, and description thereof will not be repeated.

Thus, in the second variation, the process of overlapping the three draining members 51 and 53 with one another is unnecessary, and thus, building can be easily conducted.

In the first and second embodiments and the first and second variations of the second embodiment, the width of displacement in the beam direction of solar cell panels 11 adjacent to each other in the eaves-ridge direction is ½ of the width of the solar cell panel 11, but may not be ½ of the width of the solar cell panels 11 by adjusting positions of the ridge-side frame members 15 and the eaves-side frame members 21 in the beam direction.

In the first through third embodiments and the first and second variations of the second and third embodiments, the cushioning member 13 is disposed at the front side of the base plate 9. Alternatively, the present invention is applicable to a case where the cushioning member 13 is disposed at the back side of the base plate 9.

In the second and third embodiments and the first and second variations of the second and third embodiments, the ground holes (first and second connection portions) 15 are formed in the ridge-side frame members 15 of the two solar cell panels (first and second solar cell panels) 11 adjacent to each other in the eaves-ridge direction, but may be formed in the eaves-side frame members 21.

In the second and third embodiments and the first and second variations of the second and third embodiments, the cover member 29 includes the snow guard portion 29f, but may not include the snow guard portion 29f. Only one or more of the plurality of cover members 29 may include the snow guard portion(s) 29f.

DESCRIPTION OF REFERENCE CHARACTERS 1 roof surface
11 solar cell panel
15 ridge-side frame member (first and second engaging members)
15g second holding wall (ridge-side contact face)
15h rib portion (ridge-side projection)
15n groove (engaging portion)
15q ground hole (first and second connection portions)
21 eaves-side frame member (first and second engaged members)
21f center wall (eaves-side contact face)
21e projecting wall (eaves-side projection)
21i projecting strip (engaged portion)
47 ground wire
55 gasket (ridge-side holding member, eaves-side holding member)

The invention claimed is:

1. An installation structure of solar cell panels, the installation structure including first through third solar cell panels disposed on a roof surface such that the first solar cell panel is adjacent to an eaves side of each of the second and third solar cell panels, wherein
   first and second engaging members each including an engaging portion are attached to a ridge-side end of each of the solar cell panels, the first and second engaging members being disposed with an interval in a beam direction,
   first and second engaged members each including an engaged portion are attached to an eaves-side end of each of the solar cell panels, the first and second engaged members being disposed with an interval in a beam direction, and
   the engaging portion of the first engaging member of the first solar cell panel is engaged with the engaged portion of the first engaged member of the second solar cell panel, whereas the engaging portion of the second engaging member of the first solar cell panel is engaged with the engaged portion of the second engaged member of the third solar cell panel.

2. The installation structure of solar cell panels according to claim 1, wherein
   relative positions, in the beam direction, of the engaging portion of the first engaging member and the engaged portion of the second engaged member relative to each of the solar cell panels are identical, and relative positions, in the beam direction, of the engaging portion of the second engaging member and the engaged portion of the first engaged member relative to each of the solar cell panels are identical.

3. The installation structure of solar cell panels according to claim 1, wherein
   one of the engaging portions of the first and second engaging members or the engaged portions of the first and second engaged members are grooves extending in the beam direction, and another of the engaging portions of the first and second engaging members or the engaged portions of the first and second engaged members are projecting strips inserted in the grooves.

4. The installation structure of solar cell panels according to claim 3, wherein
the engaging portions of the first and second engaging members are grooves extending in the beam direction and open to a ridge side, and are located at a front side of the ridge-side end of the solar cell panel to which the first and second engaging members are attached, and
the engaged portions of the first and second engaged members are projecting strips extending in the beam direction and projecting to the eaves side, and are located at a back side of the eaves-side end of the solar cell panel to which the first and second engaged members are attached.

5. The installation structure of solar cell panels according to claim 1, wherein
ridge-side holding members holding the ridge-side end of each of the solar cell panel at both sides in a thickness direction are attached to the ridge-side end of the solar cell panel, and are disposed with an interval in the beam direction, and
each of the first and second engaging members includes a ridge-side contact face in contact with the ridge-side holding member at the back side of the solar cell panel, and a ridge-side projection projecting to the front side of the solar cell panel relative to the ridge-side contact face at both outer sides of the ridge-side contact face in the beam direction and facing both outer sides of the ridge-side holding member in the beam direction.

6. The installation structure of solar cell panels according to claim 1, wherein
eaves-side holding members holding the eaves-side end of each of the solar cell panel at both sides in a thickness direction are attached to the eaves-side end of the solar cell panel, and are disposed with an interval in the beam direction, and
each of the first and second engaged members includes an eaves-side contact face in contact with the eaves-side holding member at the back side of the solar cell panel, and an eaves-side projection projecting to the front side of the solar cell panel relative to the eaves-side contact face at both outer sides of the eaves-side contact face in the beam direction and facing both outer sides of the eaves-side holding member in the beam direction.

7. The installation structure of solar cell panels according to claim 1, wherein
each of the first and second engaging members is formed of a metal,
a first connection portion is provided in at least one of the first and second engaging members attached to the first solar cell panel,
a second connection portion is provided in at least one of the first and second engaging members attached to the second solar cell panel, and
the first and second connection portions are connected to each other through a ground wire to thereby electrically connect the first and second solar cell panels to each other.

* * * * *